(12) United States Patent
Takenaga

(10) Patent No.: US 8,244,091 B2
(45) Date of Patent: Aug. 14, 2012

(54) FIBER FUSE TERMINATOR

(75) Inventor: Katsuhiro Takenaga, Sakura (JP)

(73) Assignee: Fujikura Ltd., Tokyo (JP)

( * ) Notice: Subject to any disclaimer, the term of this patent is extended or adjusted under 35 U.S.C. 154(b) by 165 days.

(21) Appl. No.: 12/728,903

(22) Filed: Mar. 22, 2010

(65) Prior Publication Data

US 2010/0177792 A1 Jul. 15, 2010

Related U.S. Application Data

(63) Continuation of application No. PCT/JP2009/004101, filed on Aug. 25, 2009.

(30) Foreign Application Priority Data

Aug. 26, 2008 (JP) ................................. 2008-216485

(51) Int. Cl.
*G02B 6/00* (2006.01)
*G02B 6/032* (2006.01)
*H01S 3/30* (2006.01)
*B29D 11/00* (2006.01)

(52) U.S. Cl. ............ 385/139; 385/141; 264/1.24; 372/6

(58) Field of Classification Search ............... 385/15–16, 385/88–90, 139–141
See application file for complete search history.

(56) References Cited

U.S. PATENT DOCUMENTS

| | | | |
|---|---|---|---|
| 6,518,551 B2 * | 2/2003 | Watanabe et al. ............. | 219/544 |
| 7,333,702 B2 | 2/2008 | Fujita et al. | |
| 7,529,453 B2 | 5/2009 | Miyabe et al. | |
| 7,693,378 B2 * | 4/2010 | Mukasa ........................ | 385/125 |
| 7,699,540 B2 * | 4/2010 | Miyamori et al. .............. | 385/96 |
| 2006/0176911 A1 | 8/2006 | Salin et al. | |

FOREIGN PATENT DOCUMENTS

CN 1545171 A 11/2004

(Continued)

OTHER PUBLICATIONS

Shinichi Todoroki, "Core" Melt Propagation of Optical Fibers. Nikkan Kogyo Publication Production Co., Ltd., Dec. 1, 2006, vol. 54, num. 12, pp. 48-50.

(Continued)

*Primary Examiner* — Akm Ullah
(74) *Attorney, Agent, or Firm* — Sughrue Mion, PLLC

(57) ABSTRACT

A fiber fuse terminator which is used to terminate a fiber fuse, comprising: an optical fiber which includes a core and a cladding having holes extending in a longitudinal direction thereof, in which: a refractive index of the core of the optical fiber is higher than a refractive index of a portion of the cladding excepting portions of the holes; when it is assumed that a mode field diameter at a used wavelength of the optical fiber is MFD, and a distance in a cross section perpendicular to the longitudinal direction of the optical fiber between a center of the core and a position, closest to the center of the core, of the hole that is closest to the core is Rmin, a value expressed by 2×Rmin/MFD is no less than 1.2 and no more than 2.1; when it is assumed that a width, in a diameter direction, of a region where the holes present in the cladding is W, a value expressed by W/MFD is no less than 0.3; and when it is assumed that a diameter of the cladding of the optical fiber is $D_{fiber}$, $W \leq 0.45 \times D_{fiber}$ is satisfied.

10 Claims, 10 Drawing Sheets

FOREIGN PATENT DOCUMENTS

| | | | |
|---|---|---|---|
| JP | 2002323639 | A | 11/2002 |
| JP | 4070111 | B2 | 3/2004 |
| JP | 4098195 | B2 | 3/2005 |
| JP | 2005-201936 | A | 7/2005 |
| JP | 2005-345592 | A | 12/2005 |
| JP | 2006-017816 | A | 1/2006 |
| JP | 2006093613 | A | 4/2006 |
| JP | 2006293166 | A | 10/2006 |
| JP | 2006343769 | A | 12/2006 |
| JP | 2007-108642 | * | 4/2007 |
| JP | 2007-108642 | A | 4/2007 |

OTHER PUBLICATIONS

Communication issued on Dec. 26, 2011 by the State Intellectual Property Office of the P.R. of China in the counterpart Chinese Patent Application No. 200980101573.0.

R. Kashyap, et al., "Observation of Catastrophic Self-Propelled Self-Focusing in Optical Fibres," Electronic Letters, Jan. 7, 1998, pp. 47-48, vol. 24, No. 1.

S. Todoroki, "Origin of periodic void formation during fiber fuse," Optics Express, Aug. 22, 2005, pp. 6381-6389, vol. 13, No. 17.

E.M. Dianov, et al., "Destruction of silica fiber cladding by fiber fuse effect.," Friday Morning, 2004, 3 pages total, OFC2004, TuB4.

E. Dianov, et al., "Fiber Fuse Effect in Microstructed Fibers," 2003, pp. 686-687, OFC 2003, FH2.

R. Suzuki, et al., "A study of arc-fusion splicing techniques for holey fibers," Institute of Electronics, Information of Communication Engineers, 2004, 3 pages total.

E.M. Dianov, et al., "Fiber Fuse Effect in Microstructured Fibers," IEEE Photonics Technology Letters, Jan. 2004, pp. 180-181, vol. 16, No. 1.

* cited by examiner

FIBER FUSE TERMINATOR

TECHNICAL FIELD

The present invention relates to a fiber fuse terminator, fiber laser, and an optical transmission line, which can terminate a fiber fuse in an optical transmission line, a light filter laser, and the like through which high-power light is propagated, and can prevent damage to transmission equipment, a light source, and the like.

Priority is claimed on Japanese Patent Application No. 2008-216485, filed Aug. 26, 2008, the content of which is incorporated herein by reference.

BACKGROUND ART

In recent years, in the field of optical communications, as transmission capacity increases, the intensity (power) of light which is propagated in optical fibers increases. In addition, in optical fiber lasers, as the laser output of the optical fiber lasers increases, high-power light in a range from several hundred W to several thousand W is propagated in the optical fibers.

In optical fibers in which the high-power light is propagated, there is a possibility that a fiber fuse occurs due to overheating caused by dust and the like attached to an end surface thereof or overheating caused by local-bending of the optical fiber, resulting in damage not only the optical fibers but also devices or apparatuses connected to the optical fibers (for example, refer to Non-Patent Documents 1 and 2).

FIGS. 1 and 2 respectively show a side view and a cross-sectional view illustrating a single mode optical fiber (SMF) through which the fiber fuse passes. In the drawings, the reference numeral 10 represents an optical fiber, the reference numeral 11 represents a core, and the reference numeral 12 represents a cladding. As shown in the drawings, in the optical fiber 10 through which the fiber fuse passes, voids 1 periodically occur in the center core 11. Since the voids prevent the propagation of light through the optical fiber, the passage of the fiber fuse is a fatal obstacle to the communication system, the optical fiber laser, and the like. Once the fiber fuse occurs, it will continue to pass through the optical fiber and the waveguide structure of the optical fiber will be damaged unless the intensity of the light propagating in the optical fiber drops below a threshold value. The threshold of the optical intensity varies depending on the structure of the optical fiber and the like. In the present specification, the threshold value of the optical intensity for terminating the fiber fuse is referred to as the "fiber fuse threshold value".

As techniques for terminating the fiber fuse midway along the optical fiber in order to protect optical transmission lines or apparatuses, the following techniques are known.

Patent Document 1 describes a technique of terminating the fiber fuse in which power density in the core is reduced by partially expanding a mode field diameter (MFD) of a part of a single mode optical fiber.

Patent Document 2 describes an optical fiber transmission line in which a graded index (GI) optical fiber is inserted midway on the optical fiber transmission line to create an enlarged-core portion, thereby terminating the fiber fuse phenomenon.

Patent Document 3 describes a technique of terminating the fiber fuse phenomenon by providing an optical attenuator of a photonic crystal fiber type midway on the transmission line.

Non-Patent Document 3 describes that the fiber fuse can be terminated by etching a cladding of an optical fiber to thin the outer diameter of the optical fiber to approximately twice the MFD. For example, in the case where the MFD is 9.5 μm, when the outer diameter is 10.5 to 33 μm, the fiber fuse can be terminated. In addition, Non-Patent Document 3 describes that the outer diameter of the etched portion of the optical fiber required for terminating the fiber fuse has little effect on the emission strength of the laser.

Non-Patent Document 4 examines the characteristics, with respect to fiber fuses, of a "microstructured fiber" which is provided with a center portion surrounded with 30 holes (having diameters of approximately 1 μm, and a center-to-center distance of approximately 2 μm) and allows single-mode propagation with MFD of approximately 2 μm at a wavelength of 1.06 μm. According to Non-Patent Document 4, the fiber fuse threshold value of the "microstructured fiber" is more than 10 times that of a conventional SMF having approximately the same MFD.

As a fusion-splice technique of a hole-assisted optical fiber (HAF) which includes at its center a core with a refractive index higher than a cladding and holes in the cladding, the following technique has been known.

Non-Patent Document 5 describes a technique that intermittent discharge or sweep discharge is performed on an optical fiber in which holes are disposed around a core of a general SMF to collapse the holes in a tapered shape, so that the optical fiber is fusion-spliced to the SMF with an average splicing loss of 0.05 dB.

PATENT DOCUMENTS

[Patent Document 1] Japanese Patent No. 4070111
[Patent Document 2] Japanese Patent No. 4098195
[Patent Document 3] Japanese Patent Application, First Publication No. 2005-345592

NON-PATENT DOCUMENTS

[Non-Patent Document 1] R. Kashyap and K. J. Blow, "Observation of catastrophic self-propelled self-focusing in optical fibres", Electronic Letters, Jan. 7, 1998, Vol. 24, No. 1, pp. 47-48.
[Non-Patent Document 2] Shin-ichi Todoroki, "Origin of periodic void formation during fiber fuse", Aug. 22, 2005, Vol. 13, No. 17, pp. 6381-6389.
[Non-Patent Document 3] E. M. Dianov, I. A. Bufetov and A. A. Frolov, "Destruction of silica fiber cladding by fiber fuse effect", OFC2004, 2004, TuB4.
[Non-Patent Document 4] E. Dianov, A. Frolov and I. Bufetov, "Fiber Fuse effect in microstructured fibers", OFC2003, 2003, FH2.
[Non-Patent Document 5] Suzuki Ryuji et al., "A study of fusion splicing techniques for holey fiber", Suzuki Ryuji et al., Institute of Electronics, Information and Communication Engineers, 2004 Electronics Society Conference, C-3-119.

DISCLOSURE OF THE PRESENT INVENTION

Problems to be Solved by the Present Invention

However, conventional technologies have the following problems.

In the technique described in Patent Document 1 (method of terminating the fiber fuse by expanding the MFD of a part of the SMF), it is difficult to reduce the splicing loss between the optical fiber of which the MFD is expanded and a general SMF. In order to reduce the splicing loss between the optical fiber of which the MFD is expanded and the general SMF, there is a need to diffuse a dopant in the core of the SMF in a tapered shape, or to prepare various types of optical fibers having different MFDs and splice them in multiple stages; this is extremely expensive.

In the technique described in Patent Document 2 (method of terminating the fiber fuse by inserting the GI fiber), there is a problem of considerable loss at a portion where the light is combined between the GI fiber and the SMF. In order to reduce the loss, it is necessary to enlarge the diameter of the light entering from the SMF by providing a GI fiber portion having a length of ¼ of a pitch so as to reduce the power density of the light, and then, to reduce the diameter of the light by again providing a GI fiber portion having a length of ¼ of a pitch, thereby allowing the light to enter the next SMF; this configuration is complex and expensive.

In the technique described in Patent Document 3 (method of terminating the fiber fuse by inserting the optical attenuator of a photonic crystal fiber type), since the waveguide is structured only by the holes, there is a defect that the splicing loss in the fusion-splice portion is increased. Furthermore, since the optical attenuator itself has a large insertion loss, the loss in the transmission line is also increased.

In the technique described in Non-Patent Document 3 (method of terminating the fiber fuse by etching the outer diameter of the optical fiber to approximately twice the MFD), it is difficult to achieve the intended outer diameter due to problems such as melting of the optical fiber caused by incorrect hydrogen fluoride (HF) processing time, resulting in poor manufacturability. Also, since post-processing is required, the cost increases. Furthermore, the localized thin outer diameter of the optical fiber results in weak mechanical strength. Moreover, to etch the cladding, after removing a part of a resin coating of the optical fiber, the cladding is immersed into a strong-acting chemical solution such as HF, which is a difficult operation.

In Non-Patent Document 4, although one concrete example is given of the "microstructured fiber" where the fiber fuse threshold is higher than in a general SMF, there is no detailed explanation of the method for forming the holes. Also, no consideration is given to whether, when the microstructured fiber is spliced to an SMF, the microstructured fiber can terminate a fiber fuse arising in the SMF. Moreover, the problem of considerable splicing loss with the SMF due to the lack of a core having a high refractive index remains unsolved.

The present invention has been made in the above circumstances, and an object is to provide a fiber fuse terminator which can be manufactured at a low cost and can be spliced to a single mode optical fiber at low loss and a method of terminating a fiber fuse.

Means for Solving the Problems

A fiber fuse terminator which is used to terminate a fiber fuse according to one aspect of the present invention includes an optical fiber which includes a core and a cladding having holes extending in a longitudinal direction thereof, in which: a refractive index of the core of the optical fiber is higher than a refractive index of a portion of the cladding excepting portions of the holes; when it is assumed that a mode field diameter at a used wavelength of the optical fiber is MFD, and a distance, in a cross section perpendicular to the longitudinal direction of the optical fiber, between a center of the core and a position, closest to the center of the core, of the hole that is closest to the core is Rmin, a value expressed by 2×Rmin/MFD is no less than 1.2 and no more than 2.1; when it is assumed that a width, in a diameter direction, of a region where the holes present in the cladding is W, a value expressed by W/MFD is no less than 0.3; and when it is assumed that a diameter of the cladding of the optical fiber is $D_{fiber}$, $W \leq 0.45 \times D_{fiber}$ is satisfied.

In the fiber fuse terminator according to one aspect of the present invention, when it is assumed that a distance, in the cross section perpendicular to the longitudinal direction of the optical fiber, between the center of the core and a position, closest to the center of the core, of the hole that is closest to the core is Rmin, a distance, in the cross section perpendicular to the longitudinal direction of the optical fiber, between the center of the core and a position, furthest from the center of the core, of the hole that is furthest from the core is Rmax, and a sectional area of a region between a circle having a radius of Rmax around the center of the core and a circle having a radius of Rmin around the center of the core is S, a sectional area of a portion where the holes are provided in the region between the circle having the radius of Rmax and the circle having the radius of Rmin may be no less than 20% of the sectional area S.

In the fiber fuse terminator according to one aspect of the present invention, each end of the optical fiber may be fusion-spliced to a single-mode optical fiber without holes, and the fusion-splicing loss per one point thereon is no greater than 0.50 dB.

In the fiber fuse terminator according to one aspect of the present invention, the number of the holes of the optical fiber may be no less than 3.

In the fiber fuse terminator according to one aspect of the present invention, a resin coating may cover a portion of a surface of the optical fiber, excepting a fusion-splice portion between the optical fiber and the single-mode optical fiber and a periphery thereof; and a flameproof protective layer may cover the fusion-splice portion and the periphery thereof of the surface of the optical fiber.

In the fiber fuse terminator according to one aspect of the present invention, each end of the optical fiber may be fusion-spliced to the single-mode optical fiber by intermittent discharging or sweep discharging.

In the fiber fuse terminator according to one aspect of the present invention, a length of the optical fiber may be no less than 1 mm.

A fiber fuse terminator which is used to terminate a fiber fuse according to another aspect of the present invention includes an optical fiber which includes a core and a cladding having one layer of holes extending in a longitudinal direction thereof, in which: a refractive index of the core of the optical fiber is higher than a refractive index of a portion of the cladding excepting portions of the holes; when it is assumed that a mode field diameter at a used wavelength of the optical fiber is MFD, and a distance, in a cross section perpendicular to the longitudinal direction of the optical fiber, between a center of the core and a position, closest to the center of the core, of the hole that is closest to the core is Rmin, a value expressed by 2×Rmin/MFD is no less than 1.2 and no more than 2.1; when it is assumed that a width, in a diameter direction, of a region where the holes present in the cladding is W, a value expressed by W/MFD is no less than 0.3; when it is assumed that a diameter of the cladding of the optical fiber is $D_{fiber}$, $W \leq 0.45 \times D_{fiber}$ is satisfied; and when it is assumed that a distance, in the cross section perpendicular to the longitudinal direction of the optical fiber, between the center of the core and a position, closest to the center of the core, of the hole that is closest to the core is Rmin, a distance, in the cross section perpendicular to the longitudinal direction of the optical fiber, between the center of the core and a position, furthest from the center of the core, of the hole that is furthest from the core is Rmax, and a sectional area of a region between a circle having a radius of Rmax around the center of the core and a circle having a radius of Rmin around the center of the core is S, a sectional area of a portion where the holes are provided in the region between the circle having the radius of Rmax and the circle having the radius of Rmin is no less than 20% of the sectional area S.

A fiber laser according to one aspect of the present invention includes: a pumping light source; a rare-earth doped optical fiber; and a fiber fuse terminator having an optical fiber which includes a core and a cladding having holes extending in a longitudinal direction thereof, in which: a refractive index of the core of the optical fiber is higher than a refractive index of a portion of the cladding excepting portions of the holes; when it is assumed that a mode field diameter at a used wavelength of the optical fiber is MFD, and a distance, in a cross section perpendicular to the longitudinal direction of the optical fiber, between a center of the core and a position, closest to the center of the core, of the hole that is closest to the core is Rmin, a value expressed by $2 \times Rmin/MFD$ is no less than 1.2 and no more than 2.1; when it is assumed that a width, in a diameter direction, of a region where the holes present in the cladding is W, a value expressed by W/MFD is no less than 0.3; and when it is assumed that a diameter of the cladding of the optical fiber is $D_{fiber}$, $W \leq 0.45 \times D_{fiber}$ is satisfied.

In the fiber laser according to one aspect of the present invention, an isolator may be further provided, and the fiber fuse terminator may be disposed at an output side of the isolator.

An optical transmission line according to one aspect of the present invention uses an optical fiber, in which the fiber fuse terminator of the present invention is inserted into the optical transmission line.

Advantageous Effects of the Invention

According to the fiber fuse terminator of the present invention, a fiber fuse that occurs in an optical fiber of an optical transmission line, an optical fiber laser, and the like can be terminated, thereby preventing damage to transmission equipment, a light source, and the like. The fiber fuse terminator of the present invention can be manufactured at low cost, and can be spliced to a single-mode fiber with low splicing loss, enabling it to contribute to increasing the transmission capacity and the laser output.

MODE FOR CARRYING OUT THE PRESENT INVENTION

In the following, the present invention will be described with reference to the accompanying drawings based on exemplary embodiments of the present invention.

First Embodiment

Figure 1:
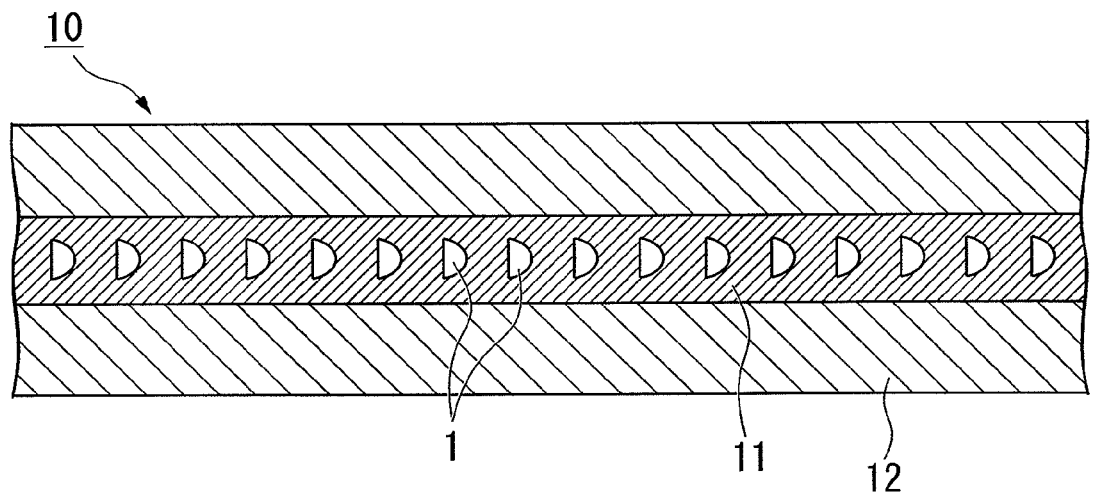
FIG. 1 is a side view schematically illustrating an example of a state in which a fiber fuse passes through a single mode optical fiber.
Figure 2:
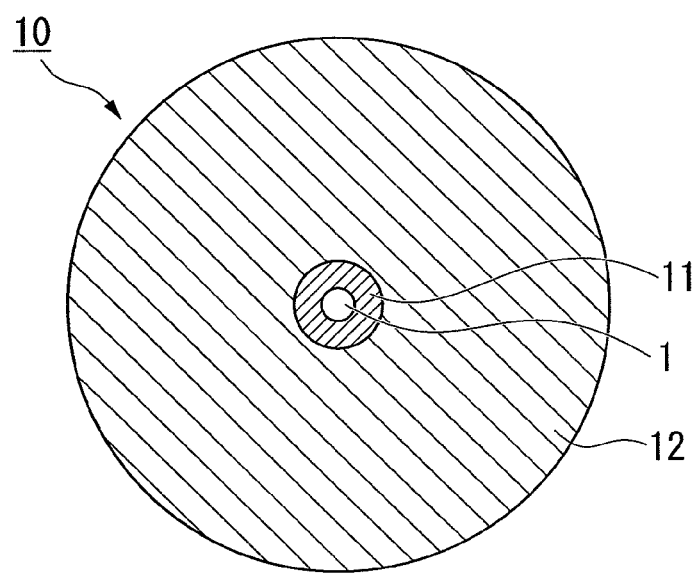
FIG. 2 is a cross-sectional view schematically illustrating an example of a state in which a fiber fuse passes through a single mode optical fiber.
Figure 3:
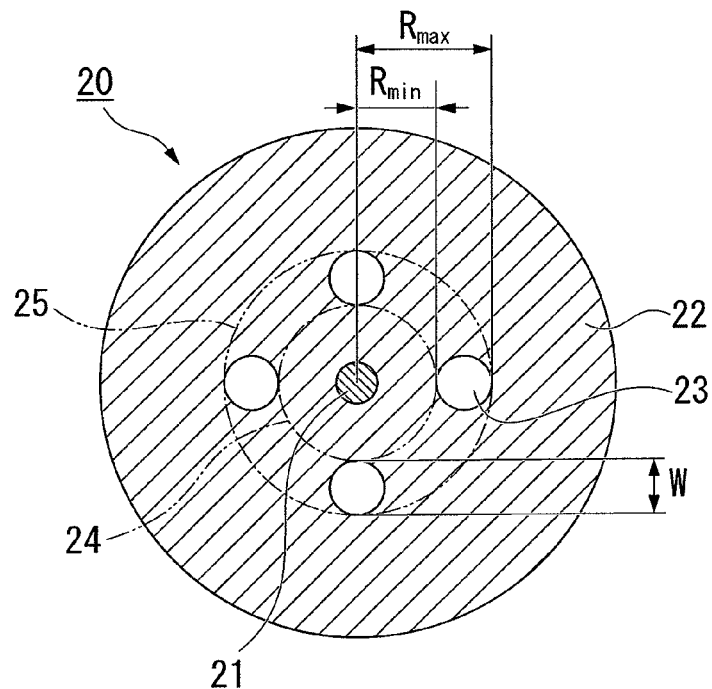
FIG. 3 is a cross-sectional view illustrating a hole-assisted optical fiber which has 4 holes in a surrounding region of a core according to a first embodiment of the present invention.

As shown in FIG. 3, a fiber fuse terminator according to a first embodiment of the present invention is constituted by an optical fiber (hereinafter, referred to as "hole-assisted optical fiber") 20 which includes a core 21 having no holes and a cladding 22 with a plurality of holes 23 (4 holes in this embodiment) which are disposed so as to extend in a longitudinal direction, and in which the refractive index of the core 21 is higher than that of a portion of the cladding 22 excepting portions of the holes 23.

In the hole-assisted optical fiber 20 shown in FIG. 3, the holes 23 in one layer are provided in the cladding 22 so as to surround the core 21.

In this embodiment, it is possible to use the hole-assisted optical fiber 20 as a fiber fuse terminator by properly setting the ratio between the mode field diameter of the hole-assisted optical fiber 20 at a used wavelength and the distance from the center of the fiber 20 to the hole 23, the ratio between the mode field diameter and the size of the hole 23, the ratio between the diameter of the cladding 22 of the fiber 20 and the size of the hole 23, and the like.

First, the ratio between the mode field diameter of the hole-assisted optical fiber 20 at a used wavelength and the distance from the center of the fiber 20 to the hole 23 will be described below. In the present invention, as a parameter to determine such a ratio, "2×Rmin/MFD" is used. MFD represents the mode field diameter of the hole-assisted optical fiber 20 at the used wavelength. Rmin represents the distance between the center of the core 21 and the inner edge of the hole 23 closest to the core 21.

In the hole-assisted optical fiber 20 of this embodiment, the value of 2×Rmin/MFD is in a range no less than 1.2 and no more than 2.1.

Further, the "inner edge of the hole 23" denotes a position in the hole 23 closest to the center of the core 21 as viewed in a cross section perpendicular to the longitudinal direction of the optical fiber. In addition, the "inner edge of the hole 23 closest to the core 21" denotes the one of the inner edges of the holes 23 that has the shortest distance from the center of the core 21. Therefore, there is no hole 23 in a position in which the distance in a radial direction from the center of the core 21 is less than the Rmin.

In the hole-assisted optical fiber 20, by setting the value of 2×Rmin/MFD in the range no less than 1.2 and no more than 2.1, the hole-assisted optical fiber 20 can be used to terminate the fiber fuse.

When the value of 2×Rmin/MFD exceeds the upper limit of the above-mentioned range, the performance of terminating the fiber fuse is degraded. From the point of view described above, the value of the ratio expressed by 2×Rmin/MFD is preferably no more than 2.1, and more preferably no more than 2.0, still more preferably no more than 1.9, and in particular preferably no more than 1.7.

In addition, when the value of 2×Rmin/MFD is less than the lower limit of the above-mentioned range, the hole is included in a range of spread of an electrical field distribution in a propagation mode, or is too close thereto. As a result, transmission loss of the hole-assisted optical fiber may increase, or the hole may be distorted when fusion-splice is performed so as to increasingly affect the waveguide structure, and thereby splicing loss may increase. From the point of view described above, the value of the ratio expressed by 2×Rmin/MFD is preferably no less than 1.2, and more preferably no less than 1.3, still more preferably no less than 1.4, and in particular preferably no less than 1.5.

Since MFD is dependent on a used wavelength, the configuration of the hole-assisted optical fiber which serves as the fiber fuse terminator is preferably designed for each used wavelength (or used wavelength band). Optical fibers are conventionally used in wavelength bands of 1.55 μm, 1.31 μm, 1.06 μm, and the like.

For example, the fiber fuse terminator designed for a used wavelength of 1.55 μm can be used in a band of 1.55 μm or a wavelength band in the vicinity thereof. Examples of the band of 1.55 μm or the wavelength band in the vicinity thereof are C-band, S-band, and L-band.

In addition, in order to achieve a more reliable effect of terminating the fiber fuse due to the presence of the holes 23 in the cladding 22 of the hole-assisted optical fiber, the diameter, the number, and the arrangement of the holes 23 may be adjusted.

As shown in FIG. 3, the holes 23 may be arranged so that a plurality of holes 23 come into contact with a circle 24 having a radius of the above-mentioned Rmin. In addition, the plurality of holes 23 may have the same hole diameter and may be provided equidistantly from the center of the core 21.

The number of the holes of the hole-assisted optical fiber is preferably two or more. It is more preferable that there are three or more holes, since this can reduce splicing loss during fusion-splicing.

Next, the ratio between the mode field diameter of the hole-assisted optical fiber 20 at the used wavelength and the size of the hole 23 will be described below. In the present invention, as a parameter to determine such a ratio, "W/MFD" is used. Here, W is the width in the diameter direction of a region (hereinafter, this may be referred to as the "hole region") in which the hole 23 presents in the cladding 22, and is defined as W=Rmax−Rmin.

Here, Rmax represents the distance between the center of the core 21 and the outer edge of the hole 23 farthest from the core 21. In addition, as described above, the Rmin represents the distance between the center of the core 21 and the inner edge of the hole 23 closest to the core 21.

Further, the "outer edge of the hole 23" in the present invention denotes a position in the hole 23 farthest from the center of the core 21 as viewed in a cross section perpendicular to the longitudinal direction of the optical fiber. In addition, the "outer edge of the hole 23 farthest from the core 21" denotes the one of the outer edges of the holes 23 that has the longest distance from the center of the core 21. Therefore, there is no hole 23 in a position in which the distance in a radial direction from the center of the core 21 exceeds the Rmax.

In the hole-assisted optical fiber 20, the value of W/MFD is preferably no less than 0.3.

As shown in FIG. 3, when the holes 23 are formed in one layer, the width W of the hole region is the same as the diameter of the hole 23. While the cross-sectional shape of the holes 23 need not be an exact circle (perfect circle), their shape is preferably circular or substantially circular (an hole-shape manufactured with the intention of achieving a circle).

In FIG. 3, the holes 23 are disposed at equal intervals along a circumference with the core 21 at the center (i.e., N holes form an N-sided regular polygon {when N is three or greater}, or are disposed opposite each other at 180° {when N=2}).

Next, the ratio between the diameter of the cladding 22 of the hole-assisted optical fiber 20 and the size of the hole 23 will be described below. In the present invention, as a parameter to determine such a ratio, "W/$D_{fiber}$" is used. Here, $D_{fiber}$ is the diameter of the cladding 22 of the fiber 20. In the hole-assisted optical fiber 20, the value of W/$D_{fiber}$ is preferably no more than 0.45. That is, W≦0.45×$D_{fiber}$ is preferable. When the ratio of the area of the holes with respect to the sectional area of the fiber is excessively large, there is a possibility that the optical fiber cannot maintain its strength.

As described above, since 0.3≦W/MFD and W≦0.45×$D_{fiber}$ are preferable, a more ideal range of W is expressed by 0.3×MFD≦W≦0.45×$D_{fiber}$.

In addition, assuming that the sectional area of a region between a circle having a radius of Rmax around the center of the core and a circle having a radius of Rmin is S, a sectional area of a portion where the holes occupy in the region of the sectional area S is preferably no less than 20% of the sectional area S.

The region of the sectional area S corresponds to the "hole region" described above.

The outer diameter of the hole-assisted optical fiber 20 is not particularly limited, but when it is spliced to another optical fiber by the fusion-splice or mechanical splice (which will be described later), the outer diameter is preferably the same as that of another optical fiber. Since a general silica-based optical fiber has the cladding diameter (diameter of the glass portion) of 80 to 125 μm (for example, 80 μm, 125 μm) and the diameter of the optical fiber coated with a resin of 250 to 400 μm (for example, 250 μm, 400 μm), the diameter of the hole-assisted optical fiber 20 may be the same therewith.

The fiber fuse terminator of the present invention includes the core 21 which has a refractive index higher than that of the portion of the cladding 22 excepting portions of the holes 23. As a result, even though the surrounding region of the hole 23 is melted so that the hole 23 is distorted when the optical fiber is subjected to the fusion-splice, or even though a refractive index matching agent is inserted in the hole 23, it is possible to maintain the waveguide structure. Therefore, as described in Non-Patent Document 5, it is possible to significantly lower the splicing loss when the hole-assisted optical fiber 20 is subjected to the fusion-splice with a single mode optical fiber.

The core 21 and the cladding 22 of the hole-assisted optical fiber 20 may be made of, for example, a silica-based glass material. The material having a higher reflective index than the cladding 22 (more particularly, the portion of the cladding 22 excepting the holes 23) is selected as the material for the core 21. For example, the core 21 may be made of a silica glass doped with germanium (specifically, $GeO_2$), and the cladding 22 may be made of a pure silica glass. In addition, the core 21 may be made of a pure silica glass, and the cladding 22 may be made of a silica glass doped with fluorine (F).

Examples of dopants used for increasing the refractive index of the silica glass include germanium (Ge) as well as aluminum (Al) and phosphorus (P). In addition, Examples of dopants used for decreasing the refractive index of the silica glass include fluorine (F) and boron (B).

The core 21 may also include a rare-earth element such as erbium (Er), ytterbium (Yb), thulium (Tm), neodymium (Nd), or terbium (Tb).

A method of differentiating the refractive indexes of the core 21 and the cladding 22 is not limited to adding only the dopant for increasing the refractive index solely to the core 21, or to adding only the dopant for decreasing the refractive index solely to the cladding 22. The core 21 may be doped with one or more of a dopant for increasing the refractive index and a dopant for reducing the refractive index, such that the core 21 achieves a higher refractive index than the cladding 22. Also, the cladding 22 may be doped with one or more of a dopant for increasing the refractive index and a dopant for reducing the refractive index, such that the cladding 22 achieves a lower refractive index than the core 21. Also, both the core 21 and the cladding 22 may be doped with one or more kinds of dopant.

The relative refractive index difference Δ between the core and cladding depends on the structure of the optical fiber (its dimension such as the outer diameter, the refractive index profile), the used wavelength, and the like. In general, the relative refractive index difference is in a range from 0.3 to 0.5%. There are cases where the present invention can be applied even if the relative refractive index difference Δ is out of this range.

In order to use the hole-assisted optical fiber 20 as a fiber fuse terminator, each end of the hole-assisted optical fiber is spliced with a general SMF (i.e., fiber without holes), and thus the hole-assisted optical fiber is inserted in the middle of an optical fiber of an optical transmission line or an optical fiber laser. As a result, when a fiber fuse which has passed through the SMF enters the hole-assisted optical fiber 20, the fiber fuse can be terminated.

The occurrence mechanism of fiber fuses and the terminating mechanism of fiber fuses by using the fiber fuse terminator of the present invention will be described in the following.

In an optical fiber through which the high intensity light is propagated, the optical fiber is increased in temperature due to overheating caused by dust and the like attached to an end surface thereof. When the temperature of the optical fiber exceeds 1,100° C., the glass bond of a part of the optical fiber is broken, and incident light is absorbed therein. The absorption of the incident light leads to an increase in the temperature of the glass, and thus the glass bond of another part is broken. These procedures are repeated, so that the temperature of the glass is explosively increased, and the core of the optical fiber enters a plasma state. This phenomenon occurs continuously toward the light source of the incident light, and that is the fiber fuse. When the fiber fuse is occurred, the glass is gasified due to the increase in the temperature of the glass. As a trace of the gasified glass, voids are generated in the optical fiber.

In order to terminate the fiber fuse, it is conceivable that the temperature of the optical fiber is lowered such that the vicious circle of the rise in temperature of the center portion of the optical fiber and the generation of the void is stopped. In the present invention, the holes 23 are provided in the hole-assisted optical fiber 20 so as to surround the core 21 (the center portion), and the size or the arrangement of the hole 23 is properly set using the above-mentioned parameters, so that the temperature of the center portion of the optical fiber can be lowered. That is, as described above, when the fiber fuse is occurred, the temperature of the center portion of the optical fiber increases so that the glass of the optical fiber enters a gas state from a solid state. When the glass enters the gas state from the solid state, the volume of the glass is expanded. In the present invention, since the holes 23 are provided so as to surround the core 21, when the temperature of the hole-assisted optical fiber 20 increases, the center portion (the core 21) of the hole-assisted optical fiber 20 can be adiabatically expanded outward (that is, toward the hole 23) in the diameter direction. When the glass in the center portion is subjected to the adiabatic expansion, the temperature of the glass is lowered. If once the temperature of the glass is lowered to about 1,100° C. or less, the absorption of the incident light does not increase, and the rise in temperature is stopped, so that the fiber fuse is terminated.

Figure 4:
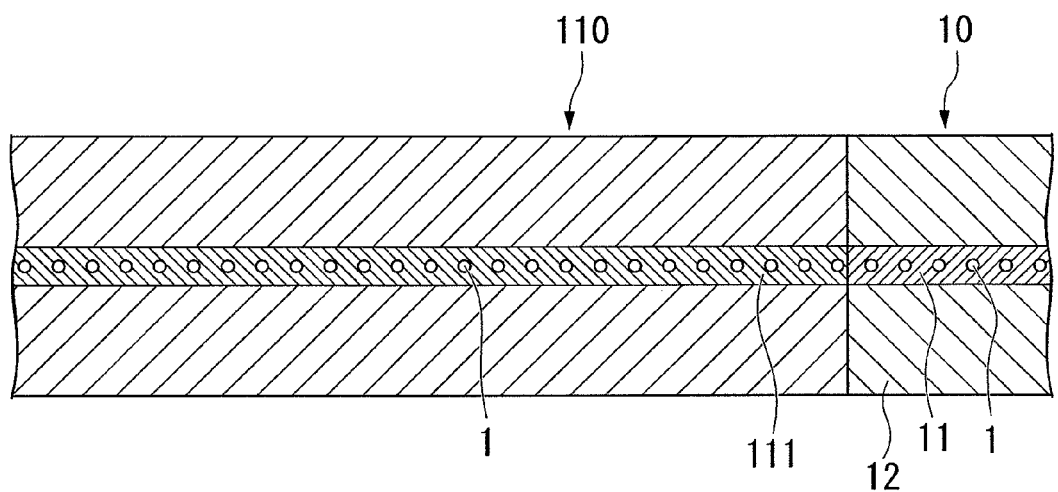
FIG. 4 is a side view schematically illustrating an example of a state in which a fiber fuse occurred in a single mode optical fiber passes through a conventional optical fiber.

FIG. 4 shows an example of a state where the fiber fuse (proceeding from right to left in the drawing) which has passed through a single mode optical fiber (SMF) 10 cannot be terminated by a known optical fiber 110 in a splice place between the optical fiber 110 and the SMF 10 so that the fiber fuse passes through the optical fiber 110. In this case, the voids 1 due to the fiber fuse are periodically generated in the core 11 of the SMF 10 and a core 111 of the optical fiber 110.

Figure 5:
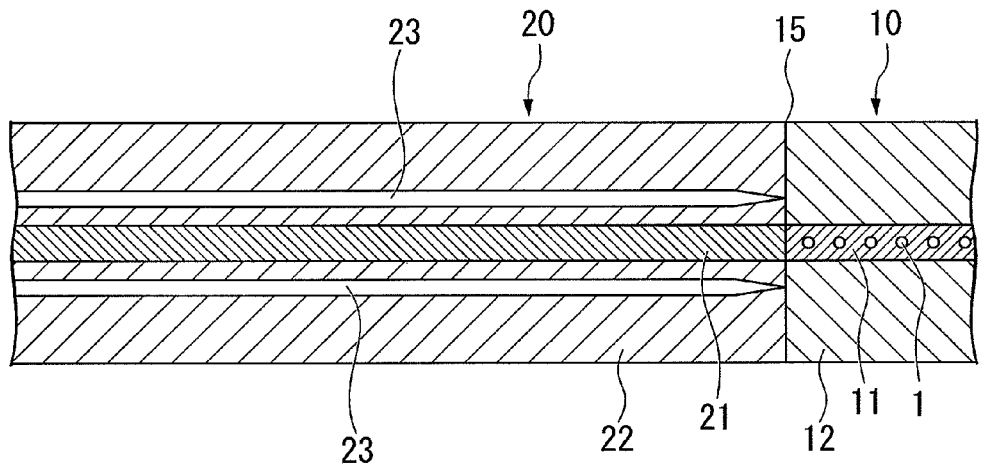
FIG. 5 is a side view schematically illustrating an example of a state in which a fiber fuse occurred in a single mode optical fiber is stopped at a splice place between the single mode optical fiber and a hole-assisted optical fiber of the present invention.
Figure 6:
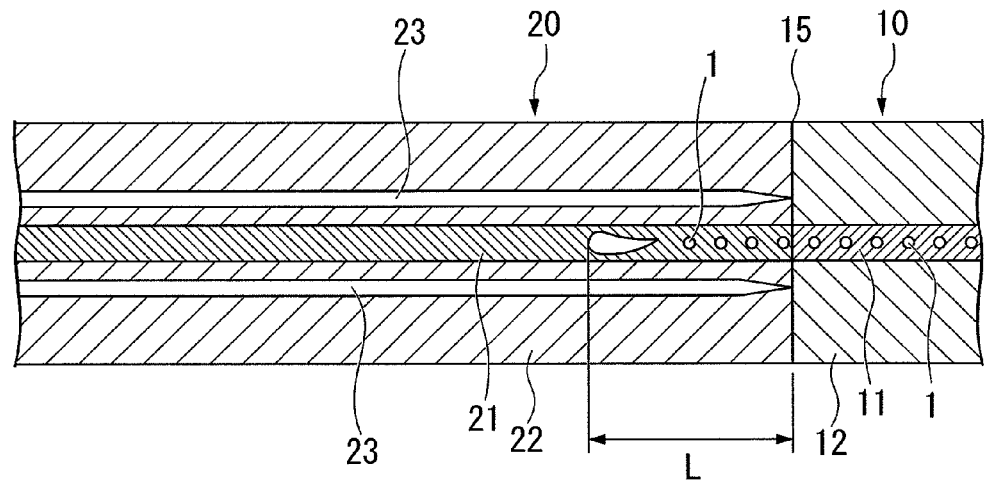
FIG. 6 is a side view schematically illustrating an example of a state in which a fiber fuse occurred in a single mode optical fiber is stopped at the middle of a hole-assisted optical fiber of the present invention.

On the other hand, according to the hole-assisted optical fiber 20 of this embodiment, as shown in FIG. 5, the fiber fuse which has passed through the SMF 10 is terminated in a splice place 15 between the hole-assisted optical fiber 20 and the SMF 10, or as shown in FIG. 6, the fiber fuse which has passed through the SMF 10 is terminated after invading slightly the hole-assisted optical fiber 20. In the case shown in FIG. 6, the voids 1 due to the fiber fuse disappear after the fiber fuse invades the core 21 of the hole-assisted optical fiber 20 by a distance L, and thereby preventing a portion further forward than it (further to the left side in the drawing) from being affected by the fiber fuse.

Although the distance L (hereinafter, simply referred to as "invasion distance"), by which the fiber fuse invades the hole-assisted optical fiber 20, may be dependent also on the power or the generation status of the light which is propagated in the optical fiber when the fiber fuse occurs, according to the hole-assisted optical fiber 20 of the present invention, the invasion distance L can be kept no more than 1 mm.

According to the hole-assisted optical fiber 20 of the present invention, since the invasion distance L of the fiber fuse can be be kept no more than 1 mm, it is possible to use the hole-assisted optical fiber 20 as a fiber fuse terminator. That is, when the length of the hole-assisted optical fiber 20 is 1 mm or more, it is possible to prevent the invasion of the fiber fuse to a portion further forward than it. Therefore, the length of the hole-assisted optical fiber 20 is preferably no less than 1 mm. Furthermore, in regard to reliability of terminating the fiber fuse, workability of the fusion-splice, and such like, the length of the hole-assisted fiber is preferably no less than 10 mm. With regard to cost, miniaturization, and such like, the length of the hole-assisted fiber is preferably 20 mm, 30 mm, 50 mm, 100 mm, and so on, or less than these.

When an occurred fiber fuse is terminated in the vicinity of the splice place 15 with the hole-assisted optical fiber 20 as shown in FIG. 5 or FIG. 6, a part of the high-power incident light which passed through the SMF 10 leaks outside the optical fiber. When resin coating exists in the vicinity of the splice place 15, the resin coating may be heated and damaged. For this reason, resin coating that is relatively flammable comparing with other materials is preferably removed from points where it is anticipated that a fiber fuse will be terminated, and from nearby those points. However, since there is a possibility that the glass cladding will be damaged if left exposed, a flameproof protective layer is preferably provided around the portion which the resin coating was removed from, as with a fusion-splice portion described later. To prevent light from leaking to the outside, the area around the fiber fuse terminator is preferably covered with metal tubing and the like.

Preferably, the hole-assisted fiber 20 and the SMF 10 are fusion-spliced, since this can reduce loss and has excellent long-term reliability. It is preferable to employ the fusion-splicing method described in Non-Patent Document 5, whereby the holes 23 of the hole-assisted fiber 20 are collapsed to a tapered shape by intermittent discharging or sweep discharging.

When the hole-assisted optical fiber 20 has the holes 23 in one layer in the surrounding region of the core 21, the sweep discharge is particularly preferable.

In the fiber fuse terminator of this embodiment, both ends of the hole-assisted fiber can be fusion-spliced to single-mode fibers (SMF) having no holes. In that case, fusion-splicing loss at any one point is preferably no greater than 0.50 dB.

In addition to fusion-splicing method, there are mechanical end-to-end splicing methods using an optical connector, mechanical splicing, V-grooves, and the like. These methods are suitable when installation of the fiber fuse terminator is temporary. With regard to power-resistance characteristics, it is undesirable for an organic substance such as a refractive index-matching material to be present between the end faces of the hole-assisted fiber and the other fiber, and for this reason they are preferably spliced by physical contact (PC) when not using the fusion-splicing method.

During fusion-splicing, mechanical splicing, and the like, the resin coating is removed from the peripheries of the claddings 12 and 22 near the ends of the optical fibers. Accordingly, a protective layer is preferably provided around the periphery of the fusion-splice portion. However, if this protective layer is formed from a material that is relatively flammable comparing with other materials, there is a possibility, as described above, that the power of incident light that leaks when a fiber fuse is terminated will heat and damage the protective layer. Accordingly, the protective layer is preferably formed from a flameproof material. Examples of flameproof materials suitable for forming the protective layer include ultraviolet (UV) curable resin containing a halogen element such as bromine (Br), a UV-curable resin containing a flameproof agent such as aluminum hydroxide and magnesium hydroxide, a resin having excellent heat-resistance such as polyimide resin, and the like.

In the hole-assisted optical fiber 20 of this embodiment, four holes 23 are provided in one layer in the surrounding region of the core 21, but the number of the holes is not limited thereto as long as the above-mentioned parameters are satisfied. For example, a hole-assisted optical fiber 120 (FIG. 7) which is provided with two holes 23, a hole-assisted optical fiber 220 (FIG. 8) which is provided with three holes 23, a hole-assisted optical fiber 320 (FIG. 9) which is provided with six holes 23, or a hole-assisted optical fiber 420 (FIG. 10) which is provided with eight holes 23 may be employed.

Second Embodiment

A fiber fuse terminator according to a second embodiment of the present invention will be described in the following. The second embodiment is different from the first embodiment in that the holes are provided in a plurality of layers. The same components as those of the first embodiment are designated by the same reference numerals, and the description thereof will be omitted.

Figure 11:
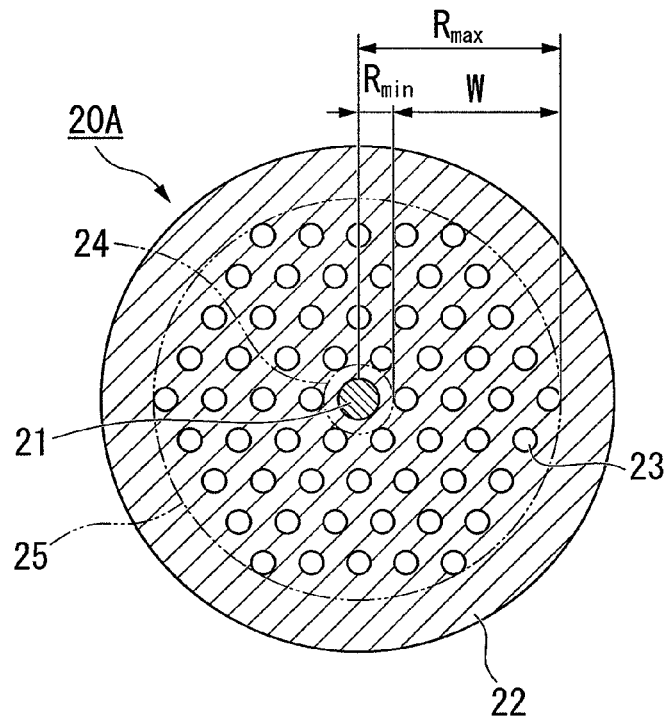
FIG. 11 is a cross-sectional view illustrating a hole-assisted optical fiber which has 60 holes disposed in a plurality of layers in a surrounding region of a core according to a second embodiment of the present invention.

As shown in FIG. 11, the fiber fuse terminator according to this embodiment is constituted by an optical fiber (hereinafter, referred to as "hole-assisted optical fiber") 20A which includes a core 21 having no holes and a cladding 22 with a plurality of holes 23 (60 holes in this embodiment) which are disposed so as to extend in a longitudinal direction, and in which the reflective index of the core 21 is higher than that of a portion of the cladding 22 excepting portions of the holes 23.

In addition, in the hole-assisted optical fiber 20A shown in FIG. 11, the holes 23 are provided in a plurality of layers (4 layers in this embodiment) in the surrounding region of the core 21.

In this embodiment, similar to the first embodiment, it is possible to use the hole-assisted optical fiber 20A as the fiber fuse terminator by properly setting the ratio (2×Rmin/MFD) between the mode field diameter of the hole-assisted optical fiber 20A at a used wavelength and the distance from the center of the fiber 20A to the hole 23, the ratio (W/MFD) between the mode field diameter and the size of the hole 23, the ratio (W/$D_{fiber}$) between the diameter of the cladding 22 of the fiber 20A and the size of the hole 23, and the like.

First, the ratio (2×Rmin/MFD) between the mode field diameter of the hole-assisted optical fiber 20A at a used wavelength and the distance from the center of the fiber 20A to the hole 23 will be described below. Also in the hole-assisted optical fiber 20A of this embodiment, by setting the value of 2×Rmin/MFD in a range no less than 1.2 and no more than 2.1, it is possible to terminate a fiber fuse using the hole-assisted optical fiber.

From the point of view of performance for terminating the fiber fuse, the value of the ratio expressed by 2×Rmin/MFD is preferably no more than 2.1, and more preferably no more than 2.0, still more preferably no more than 1.9, and in particular preferably no more than 1.7. From the point of view of electrical field distribution, the value of the ratio expressed by 2×Rmin/MFD is preferably no less than 1.2, and more preferably no less than 1.3, still more preferably no less than 1.4, and in particular preferably no less than 1.5.

In addition, in order to achieve a more reliable effect of terminating the fiber fuse due to the presence of the holes 23 in the cladding 22 of the hole-assisted optical fiber, the diameter, the number, and the arrangement of the holes 23 may be adjusted.

As shown in FIG. 11, the holes 23 may be arranged so that a plurality of holes 23 come into contact with a circle 24 having a radius of the above-mentioned Rmin. In addition, a plurality of holes 23 may have the same hole diameter and may be provided equidistantly from the center of the core 21.

The number of the holes of the hole-assisted optical fiber is preferably two or more. It is more preferable that there are three or more holes, since this can reduce splicing loss during fusion-splicing.

Next, the ratio (W/MFD) between the mode field diameter of the hole-assisted optical fiber 20A at the used wavelength and the size of the hole 23 will be described below. Also in the hole-assisted optical fiber 20A of this embodiment, the value of W/MFD is preferably no less than 0.3.

Here, since the holes 23 are disposed in a plurality of layers in this embodiment, the width W of the hole region is larger than the diameter of the hole 23. In FIG. 11, the circle 24 with a radius of Rmin around the center of the core 21 internally contacts the inner edges of the air-holes 23 belonging to the layer closest to the core 21, while the circle 25 with a radius of Rmax around the center of the core 21 externally contacts the outer edges of the air-holes 23 belonging to the layer furthest from the core 21.

Next, the ratio ($W/D_{fiber}$) between the diameter of the cladding 22 of the hole-assisted optical fiber 20A and the size of the hole 23 will be described below. Also in the hole-assisted optical fiber 20A of the present invention, the value of $W/D_{fiber}$ is preferably no more than 0.45. That is, $W \leq 0.45 \times_{fiber}$ is preferable.

In addition, assuming that the sectional area of a region between a circle having a radius of Rmax around the center of the core and a circle having a radius of Rmin is S, a sectional area of a portion where the holes occupy in the region of the sectional area S is preferably no less than 20% of the sectional area S.

The outer diameter of the hole-assisted optical fiber 20A is not particularly limited, but when it is spliced to another optical fiber by the fusion-splice or mechanical splice (which will be described later), the outer diameter is preferably the same as that of another optical fiber. Since a general silica-based optical fiber has the cladding diameter (diameter of the glass portion) of 80 to 125 μm (for example, 80 μm, 125 μm) and the diameter of the optical fiber coated with a resin of 250 to 400 μm (for example, 250 μm, 400 μm), the diameter of the hole-assisted optical fiber 20 may be the same therewith.

The fiber fuse terminator of this embodiment includes the core 21 which has a refractive index higher than that of the portions of the cladding 22 excepting portions of the holes 23. Since the manufacturing method and the material of the core 21, the cladding 22, and the hole 23 are the same as those of the first embodiment, the description thereof will be omitted.

In order to use the hole-assisted optical fiber 20A as a fiber fuse terminator, each end of the hole-assisted optical fiber is spliced with a general SMF (i.e., fiber without holes), and thus the hole-assisted optical fiber is inserted in the middle of an optical fiber of an optical transmission line or an optical fiber laser. As a result, when a fiber fuse which has passed through the SMF enters the hole-assisted optical fiber 20A, the fiber fuse can be terminated.

According to the hole-assisted optical fiber 20A of this embodiment, since the invasion distance L of the fiber fuse can be be kept no more than 1 mm, it is possible to use the hole-assisted optical fiber 20A as a fiber fuse terminator. That is, when the length of the hole-assisted optical fiber 20A is 1 mm or more, it is possible to prevent the invasion of the fiber fuse to a portion further forward than it. Therefore, the length of the hole-assisted optical fiber 20A is preferably no less than 1 mm. Furthermore, in regard to reliability of terminating the fiber fuse, workability of the fusion-splice, and such like, the length of the hole-assisted fiber is preferably no less than 10 mm. With regard to cost, miniaturization, and such like, the length of the hole-assisted fiber is preferably 20 mm, 30 mm, 50 mm, 100 mm, and so on, or less than these.

In addition, resin coating that is relatively flammable comparing with other materials is preferably removed in the vicinity of the splice place between the hole-assisted optical fiber 20A and the SMF 10. However, since there is a possibility that the glass cladding will be damaged if left exposed, a flameproof protective layer is preferably provided around the portion which the resin coating was removed from, as with a fusion-splice portion described later. To prevent light from leaking to the outside, the area around the fiber fuse terminator is preferably covered with metal tubing and the like.

Preferably, the hole-assisted fiber 20A and the SMF 10 are fusion-spliced, since this can reduce loss and has excellent long-term reliability. It is preferable to employ the fusion-splicing method described in Non-Patent Document 5, whereby the holes 23 of the hole-assisted fiber 20A are collapsed to a tapered shape by intermittent discharging or sweep discharging.

In addition, in the case of the hole-assisted fiber 20A which has a plurality of layers (four layers in FIG. 4) of holes 23 in the surrounding region of the core 21, it is preferable to perform intermittent discharging such that charging switches ON/OFF for a short period after a short period of charging.

In the fiber fuse terminator of this embodiment, both ends of the hole-assisted fiber can be fusion-spliced to single-mode fibers (SMF) having no holes. In that case, fusion-splicing loss at any one point is preferably no greater than 0.50 dB.

In addition to fusion-splicing method, there are mechanical end-to-end splicing methods using an optical connector, mechanical splicing, V-grooves, and the like. These methods are suitable when installation of the fiber fuse terminator is temporary. With regard to power-resistance characteristics, it is undesirable for an organic substance such as a refractive index-matching material to be present between the end faces of the hole-assisted fiber and the other fiber, and for this reason they are preferably spliced by physical contact (PC) when not using the fusion-splicing method.

During fusion-splicing, mechanical splicing, and the like, the resin coating is removed from the peripheraries of the claddings 12 and 22 near the ends of the optical fibers. Accordingly, a protective layer formed from a flameproof material is preferably provided around the periphery of the fusion-splice portion. Examples of flameproof materials suitable for forming the protective layer include ultraviolet (UV) curable resin containing a halogen element such as bromine (Br), a UV-curable resin containing a flameproof agent such as aluminum hydroxide and magnesium hydroxide, a resin having excellent heat-resistance such as polyimide resin, and the like.

Figure 12:
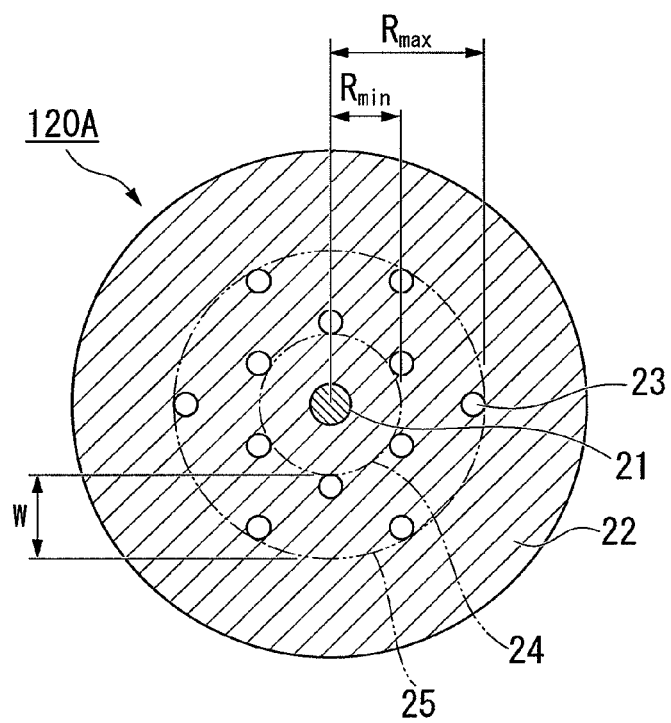
FIG. 12 is a cross-sectional view illustrating a hole-assisted optical fiber which has 12 holes according to a modified example of the second embodiment of the present invention.

In the hole-assisted optical fiber 20A of this embodiment, sixty holes 23 are provided in four layers in the surrounding region of the core 21, but the number of the holes or the number of layers is not limited thereto. For example, as shown in FIG. 12, a hole-assisted optical fiber 120A, which is provided with twelve holes 23 in two layers, may be employed.

EXAMPLES

Hereinafter, the present invention will be described in detail with examples.

Figure 13:
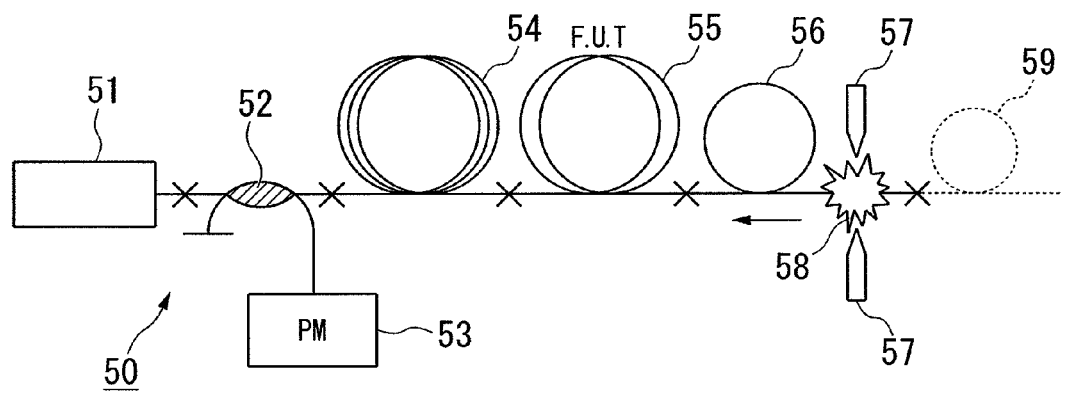
FIG. 13 is a view illustrating an exemplary configuration of a measurement system for evaluating terminating performance of a fiber fuse.

FIG. 13 shows a measurement system which is used for evaluating the fiber fuse terminating performance. In a measurement system 50, a light source 51, a coupler 52 which branches the output light of the light source 51 into a power monitor 53, a dummy fiber 54, an optical fiber 55 to be measured, an SMF 56, and a coreless fiber 59 are connected in this order. The optical fibers (which include surplus parts of the light source 51 and the coupler 52) are spliced together by fusion-splicing. Further, the symbol x in FIG. 13 represents the fusion-splice point.

To generate a fiber fuse in the measuring system 50, electrodes 57 and 57 are provided to heat the SMF 56 with arc discharge 58. The electrodes 57 and 57 used here are those contained in an optical fusion device.

While high-power light from the light source 51 is entering the fibers 54, 55, 56, and 59, the SMF 56 is heated by the arc discharge 58 to over 1,100° C., whereby a fiber fuse can be deliberately generated. By observing how the fiber fuse generated in the SMF 56 propagates through the optical fiber 55 to be measured, it is possible to investigate whether the optical fiber 55 to be measured can terminate the fiber fuse.

The coupler 52 monitors the output light of the light source 51. The branch ratio of the couple 52 is 30 dB.

The dummy fiber 54 is provided to protect the light source, even when a fiber fuse passes through the optical fiber 55 to be measured. The length of this dummy fiber 54 is 1 km.

The length of the optical fiber 55 to be measured is 30 m, and the length of the SMF 56 is 5 m.

The coreless fiber 59 is used for protecting the light source 51 from reflected light from the terminal, by preventing reflected light at the terminal.

Using the apparatus shown in FIG. 13, Experiments 1 to 10 were performed as described below. In addition, Table 1 shows conditions and results when the invasion distance of the fiber fuse into the optical fiber 55 to be measured is no more than 1 mm, and Table 2 shows conditions and results when the invasion distance exceeds 1 mm.

In the experiment numbers of Table 1 and Table 2, consecutive numbers for distinguishing a plurality of examples are added after numbers corresponding to Experiments 1 to 10.

TABLE 1

| | Experiment Number | Sample ID | $D_{fiber}$ [μm] | Number of holes | Hole diameter [μm] | Incident power [W] | Incident wavelength [μm] | Rmin [μm] | Rmax [μm] |
|---|---|---|---|---|---|---|---|---|---|
| Embodiment 1 | 1-1 | Fiber A | 125 | 6 | 7.3 | 9.8 | 1.55 | 8.5 | 15.8 |
| | 1-2 | | | | | 3.0 | | | |
| Embodiment 2 | 3-1 | Fiber C | 125 | 4 | 16.3 | 8.1 | 1.55 | 10.6 | 26.9 |
| | 3-2 | | | | | 4.7 | | | |
| | 3-3 | | | | | 2.1 | | | |
| | 3-4 | | | | | 1.7 | | | |
| | 3-5 | | | | | 1.5 | | | |
| Embodiment 3 | 4-1 | Fiber D | 125 | 8 | 3.0 | 1.7 | 1.55 | 9.0 | 12.0 |
| | 4-2 | | | | | 8.0 | | | |
| Embodiment 4 | 4-3 | Fiber E | 125 | 8 | 3.2 | 1.7 | 1.55 | 10.2 | 13.4 |
| | 4-4 | | | | | 8.0 | | | |
| Embodiment 5 | 5-1 | Fiber H | 125 | 2 | 14.5 | 3.0 | 1.55 | 8.5 | 23.0 |
| | 5-2 | | | | | 10.0 | | | |
| Embodiment 6 | 5-3 | Fiber I | 125 | 3 | 7.6 | 3.0 | 1.55 | 8.3 | 15.9 |
| | 5-4 | | | | | 10.0 | | | |
| Embodiment 7 | 6-1 | Fiber J | 125 | 12 | 4.0 | 10.0 | 1.55 | 8.6 | 23.6 |
| Embodiment 8 | 6-2 | Fiber K | 125 | 60 | 3.9 | 10.0 | 1.55 | 8.5 | 38.5 |
| Embodiment 9 | 7-1 | Fiber L | 125 | 6 | 6.2 | 8.0 | 1.06 | 5.5 | 11.7 |
| | 7-2 | | | | | 20.0 | | | |
| Embodiment 10 | 7-5 | Fiber N | 125 | 2 | 4.5 | 8.0 | 1.06 | 5.5 | 10.0 |
| Embodiment 11 | 9-1 | Fiber C | 125 | 4 | 16.3 | 3.0 | 1.55 | 10.6 | 26.9 |
| Embodiment 12 | 9-2 | Fiber O | 125 | 4 | 14.3 | 3.0 | 1.55 | 7.5 | 21.8 |
| Embodiment 13 | 9-3 | Fiber P | 125 | 4 | 16.7 | 3.0 | 1.55 | 5.5 | 22.2 |

| | Experiment Number | MFD [μm] | W [μm] | 2Rmin/MFD | W/MFD | $0.45*D_{fiber}$ [%] | Area ratio of hole [%] | Propagation status | Fusion-splicing loss [dB/point] |
|---|---|---|---|---|---|---|---|---|---|
| Embodiment 1 | 1-1 | 10.2 | 7.3 | 1.67 | 0.72 | 56.25 | 45.1 | Good | 0.06 |
| | 1-2 | | | | | | | Good | |
| Embodiment 2 | 3-1 | 10.4 | 16.3 | 2.04 | 1.57 | 56.25 | 43.5 | Good | 0.04 |
| | 3-2 | | | | | | | Good | |
| | 3-3 | | | | | | | Good | |
| | 3-4 | | | | | | | Good | |
| | 3-5 | | | | | | | Good | |
| Embodiment 3 | 4-1 | 10.0 | 3.0 | 1.80 | 0.30 | 56.25 | 28.6 | Good | 0.03 |
| | 4-2 | | | | | | | Good | |
| Embodiment 4 | 4-3 | 10.1 | 3.2 | 2.02 | 0.32 | 56.25 | 27.1 | Good | 0.03 |
| | 4-4 | | | | | | | Good | |
| Embodiment 5 | 5-1 | 10.0 | 14.5 | 1.70 | 1.45 | 56.25 | 23.0 | Good | 0.50 |
| | 5-2 | | | | | | | Good | |
| Embodiment 6 | 5-3 | 9.8 | 7.6 | 1.69 | 0.78 | 56.25 | 23.6 | Good | 0.15 |

TABLE 1-continued

|  |  |  |  |  |  |  |  | Good |  |
|---|---|---|---|---|---|---|---|---|---|
|  | 5-4 |  |  |  |  |  |  | Good |  |
| Embodiment 7 | 6-1 | 8.2 | 15.0 | 2.09 | 1.83 | 56.25 | 9.9 | Good | 0.10 |
| Embodiment 8 | 6-2 | 8.1 | 30.0 | 2.10 | 3.70 | 56.25 | 16.2 | Good | 0.12 |
| Embodiment 9 | 7-1 | 5.8 | 6.2 | 1.90 | 1.07 | 56.25 | 54.1 | Good | 0.20 |
|  | 7-2 |  |  |  |  |  |  | Good |  |
| Embodiment 10 | 7-5 | 5.8 | 4.5 | 1.90 | 0.78 | 56.25 | 14.5 | Good | 0.22 |
| Embodiment 11 | 9-1 | 10.4 | 16.3 | 2.04 | 1.57 | 56.25 | 43.5 | Good | 0.06 |
| Embodiment 12 | 9-2 | 9.8 | 14.3 | 1.53 | 1.46 | 56.25 | 48.8 | Good | 0.15 |
| Embodiment 13 | 9-3 | 9.2 | 16.7 | 1.20 | 1.82 | 56.25 | 60.3 | Good | 0.60 |

TABLE 2

|  | Experiment Number | Sample ID | $D_{fiber}$ [μm] | Number of holes | Hole diameter [μm] | Incident power [W] | Incident wavelength [μm] | Rmin [μm] | Rmax [μm] |
|---|---|---|---|---|---|---|---|---|---|
| Comparative Example 1 | 2-1<br>2-2 | Fiber B | 125 | 4 | 17.4 | 4.4<br>2.0 | 1.55 | 19.4 | 36.8 |
| Comparative Example 2 | 4-5<br>4-6 | Fiber F | 125 | 8 | 3.5 | 1.7<br>8.0 | 1.55 | 12.0 | 15.5 |
| Comparative Example 3 | 4-7<br>4-8 | Fiber G | 125 | 8 | 4.2 | 1.7<br>8.0 | 1.55 | 14.8 | 19.0 |
| Comparative Example 4 | 7-3<br>7-4 | Fiber M | 125 | 6 | 1.4 | 8.0<br>20.0 | 1.06 | 5.6 | 7.0 |
| Comparative Example 5 | 8-2<br>8-3 | Fiber C | 125 | 4 | 16.3 | 1.5<br>1.5 | 1.31<br>1.06 | 10.6 | 26.9 |
| Comparative Example 6 | 10-1 | Fiber Q | 125 | 60 | 3.9 | 10.0 | 1.55 | 8.5 | 38.5 |
| Comparative Example 7 | 10-2 | Fiber R | 125 | 4 | 14.3 | 10.0 | 1.55 | 7.5 | 21.8 |

|  | Experiment Number | MFD [μm] | W [μm] | 2Rmin/MFD | W/MFD | $0.45*D_{fiber}$ [%] | Area ratio of hole [%] | Propagation status | Fusion-splicing loss [dB/point] |
|---|---|---|---|---|---|---|---|---|---|
| Comparative Example 1 | 2-1<br>2-2 | 10.8 | 17.4 | 3.59 | 1.61 | 56.25 | 31.0 | Bad<br>Bad | 0.03 |
| Comparative Example 2 | 4-5<br>4-6 | 10.3 | 3.5 | 2.33 | 0.34 | 56.25 | 24.0 | Bad<br>Bad | 0.02 |
| Comparative Example 3 | 4-7<br>4-8 | 10.5 | 4.2 | 2.82 | 0.40 | 56.25 | 24.9 | Bad<br>Bad | 0.02 |
| Comparative Example 4 | 7-3<br>7-4 | 5.9 | 1.4 | 1.90 | 0.24 | 56.25 | 16.7 | Bad<br>Bad | 0.18 |
| Comparative Example 5 | 8-2<br>8-3 | 9.3<br>8.3 | 16.3 | 2.28<br>2.55 | 1.75<br>1.96 | 56.25<br>56.25 | 43.5 | Bad<br>Bad | 0.05<br>— |
| Comparative Example 6 | 10-1 | 14.0 | 30.0 | 1.21 | 2.14 | 56.25 | 16.2 | Good | 0.80 |
| Comparative Example 7 | 10-2 | 12.5 | 14.3 | 1.20 | 1.14 | 56.25 | 48.8 | Good | 0.75 |

In Table 1 and Table 2, Rmin represents the distance between the center of the core of the optical fiber 55 to be measured and the inner edge of the hole closest to the core, Rmax represents the distance between the center of the core of the optical fiber 55 to be measured and the outer edge of the hole farthest from the core, and W represents the width of the hole region of the optical fiber 55 to be measured.

The "area ratio of the hole" represents the area ratio occupied by the holes in the hole region (that is, the region between a circle having a radius of Rmin around the center of the core and a circle having a radius of Rmax around the center of the core) of the optical fiber 55 to be measured, expressed in a percentage.

The evaluation of the "propagation status" is determined as "Good" when the invasion distance of the fiber fuse into the optical fiber 55 to be measured is no more than 1 mm (the fiber fuse can be terminated), and as "Bad" when the invasion distance exceeds 1 mm (the fiber fuse cannot be terminated but passes).

$D_{fiber}$ represents the diameter of the cladding of the optical fiber 55 to be measured.

The fusion-splicing loss [dB/point] represents the fusion-splicing loss per fusion-splice point.

Example 1

Figure 9:
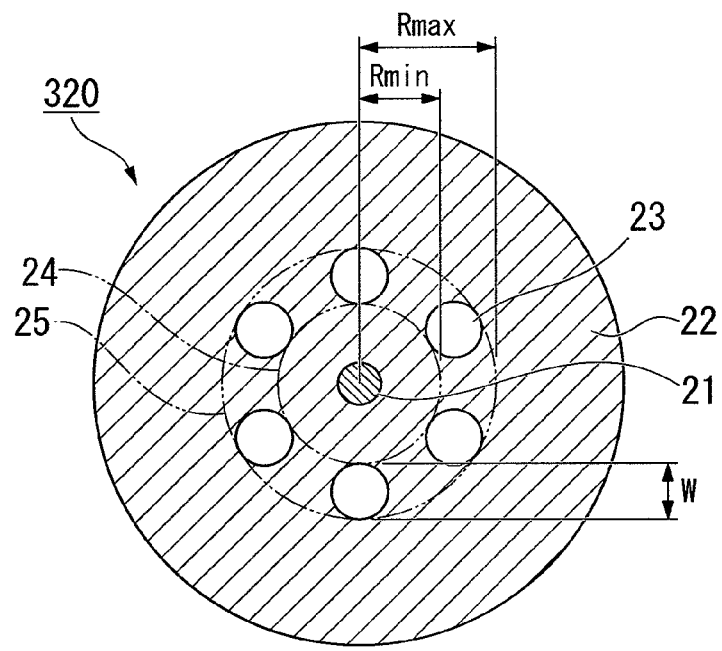
FIG. 9 is a cross-sectional view illustrating a hole-assisted optical fiber which has 6 holes according to a modified example of the first embodiment of the present invention.

The HAF (Fiber A) having the cross section shown in FIG. 9 is used as the optical fiber 55 to be measured, and Experiments 1-1 and 1-2 were performed by changing the incident power.

The experiment numbers 1-1 and 1-2 in Table 1 show the parameters of Fiber A and the experiment conditions. As for Fiber A, the cladding diameter $D_{fiber}$ is 125 μm, the number of the holes is 6, Rmin is 8.5 μm, W is 7.3 μm, Rmax is 15.8 μm, and the MFD at the wavelength of 1.55 μm is 10.2 μm. In addition, 2×Rmin/MFD is 1.67.

As for Fiber A, when the incident wavelength is 1.55 μm, and when the incident power is 9.8 W (experiment number 1-1) and when the incident power is 3.0 W (experiment number 1-2), the terminating performance of the fiber fuse was investigated. In both Experiments 1-1 and 1-2, the value of 2×Rmin/MFD is 1.67, which is in a range no less than 1.2 and no more than 2.1. The value of W/MFD is 0.72, which is no less than 0.3. In addition, since the value of W is 7.3 μm and the value of $0.45 \times D_{fiber}$ is 56.25 μm, $W \leq 0.45 \times D_{fiber}$ is satisfied.

As a result of the experiments, the fiber fuse was able to be terminated in both the incident powers.

As described above, when the values of 2×Rmin/MFD, W/MFD, and $0.45 \times D_{fiber}$ are in the above-mentioned ranges, the fiber fuse can be terminated using the hole-assisted optical fiber.

As a result, when the HAF of this experiment is used as a fiber fuse terminator and inserted in the middle of an optical transmission line or an optical fiber laser, the transmission loss can be suppressed, and the fiber fuse can be terminated.

Example 2

The HAF (Fiber C) having the cross section shown in FIG. 3 is used as the optical fiber 55 to be measured, and Experiments 3-1 to 3-5 were performed by changing the incident power.

The experiment numbers 3-1 to 3-5 in Table 1 show the parameters of Fiber C and the experiment conditions. As for Fiber C, the cladding diameter $D_{fiber}$ is 125 μm, the number of the holes is 4, Rmin is 10.6 μm, W is 16.3 μm, Rmax is 26.9 μm, and the MFD at the wavelength of 1.55 μm is 10.4 μm. In addition, 2×Rmin/MFD is 2.04.

As for Fiber C, when the incident wavelength is 1.55 μm, and when the incident power is 8.1 W (experiment number 3-1), when the incident power is 4.7 W (experiment number 3-2), when the incident power is 2.1 W (experiment number 3-3), when the incident power is 1.7 W (experiment number 3-4), and when the incident power is 1.5 W (experiment number 3-5), the terminating performance of the fiber fuse was investigated. Further, the incident power of 1.5 W is a value close to the fiber fuse threshold value in a general SMF without holes, and the fiber fuse does not occur in a power lower than this incident power.

In all the cases of experiments 3-1 to 3-5, the value of 2×Rmin/MFD is 2.04, which is in a range no less than 1.2 and no more than 2.1. The value of W/MFD is 1.57, which is no less than 0.3. In addition, since the value of W is 16.3 μm and the value of $0.45 \times D_{fiber}$ is 56.25 μm, $W \leq 0.45 \times D_{fiber}$ is satisfied.

As a result of the experiments, in all the cases of the incident power, the fiber fuse slightly invaded the HAF from the SMF as shown in FIG. 6, but it stopped within 1 mm.

As described above, when the values of 2×Rmin/MFD, W/MFD, and $0.45 \times D_{fiber}$ are in the above-mentioned ranges, the fiber fuse can be terminated using the hole-assisted optical fiber.

Figure 14:
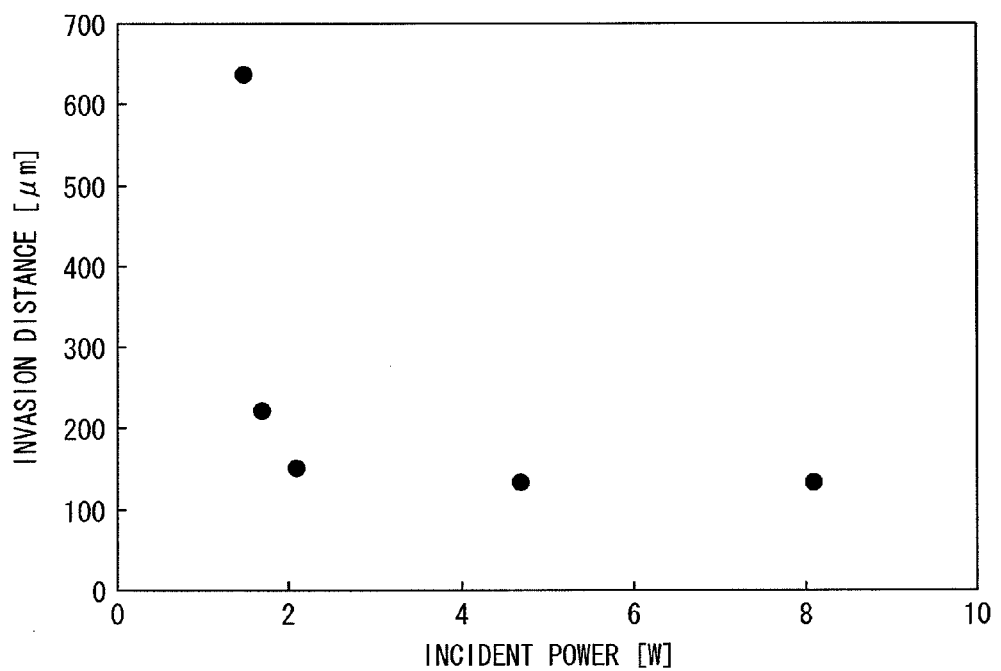
FIG. 14 is a graph illustrating the relationship between incident power and invasion distance of a fiber fuse in Experiment 3.

In Experiment 3, it was ascertained that the invasion distance is changed according to the incident power as shown in the graph of FIG. 14. As shown in FIG. 14, as the incident power is closer to the fiber fuse threshold value, the invasion distance is extended.

Figure 15:
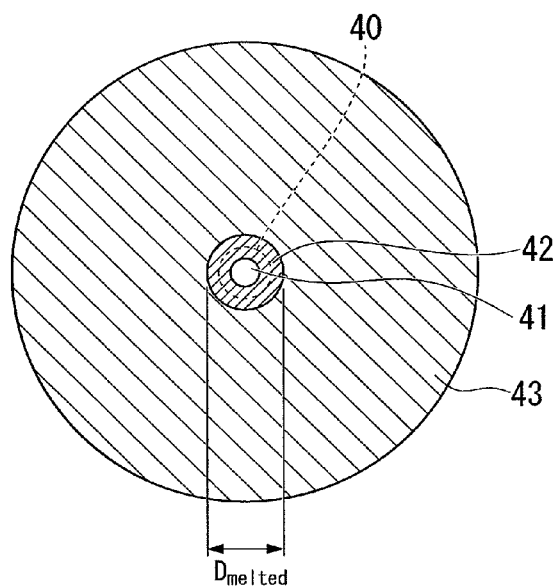
FIG. 15 is a cross-sectional view illustrating the diameter of a melted portion of a single mode optical fiber.

To ascertain the cause of this phenomenon, a cross-section of a fiber where a fiber fuse occurred was observed. FIG. 15 is a schematic view of a cross-section of an SMF where a fiber fuse has occurred. In the drawing, the reference numeral 40 represents a core, the reference numeral 41 represents a void, the reference numeral 42 represents a melted portion, and the reference numeral 43 represents a cladding. In cross-section of the SMF, the black ring-shaped melted part 42 was observed around the void 41 generated in the core 40. This melted part 42 was melted by the passage of the fiber fuse.

Figure 16:
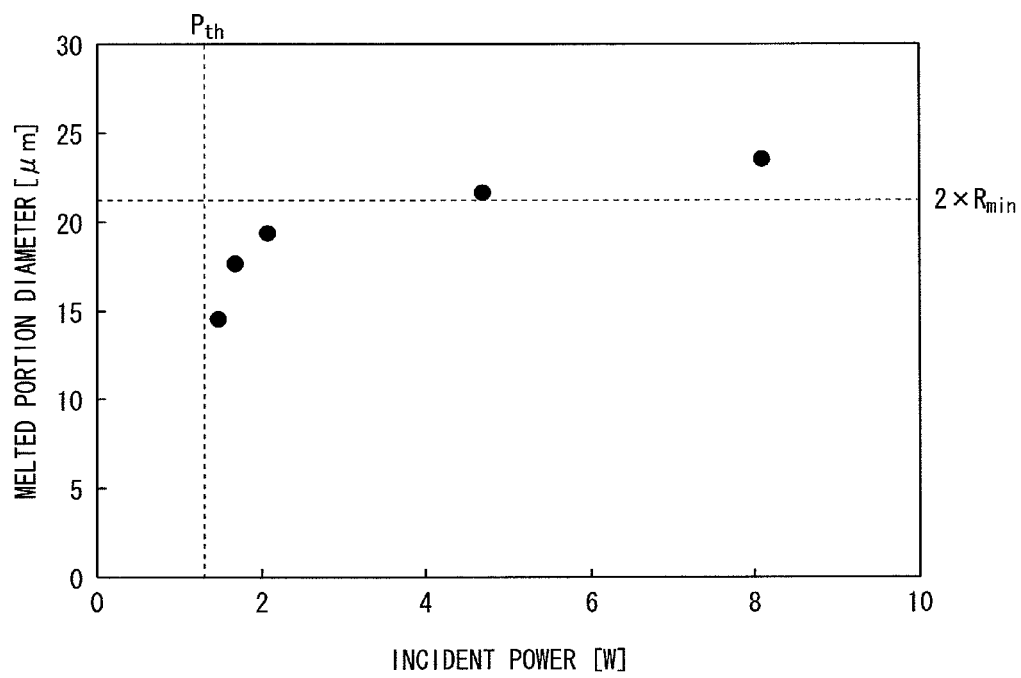
FIG. 16 is a graph illustrating the relationship between incident power and diameter of a melted portion in Experiment 3.

Results of measuring the diameter $D_{melted}$ of this melted part 42 are shown in FIG. 16. As shown in FIG. 16, as the incident power approaches the general SMF fiber fuse threshold Pth=1.5 W, the diameter $D_{melted}$ of the melted part 42 decreases sharply.

Since the SMF 56 used in this experiment has an MFD of 10.4 μm at a wavelength of 1.55 uμm, it can be considered that, also in the HAF of the measured optical fiber 55, as the incident power approaches the general SMF fiber fuse threshold, the diameter $D_{melted}$ decreases sharply. In FIG. 16, the 2×Rmin value of fiber C used in Experiment 3 (i.e., 21.2 μm) is indicated by a horizontal broken line.

As described above, the hole-assisted optical fiber of the present invention is provided with the holes such that the holes surround the core, so that the center portion (the core) of the hole-assisted optical fiber is adiabatically expanded outward (that is, toward the holes) in the radial direction so as to lower the temperature of the glass in the center portion. As a result, the fiber fuse is terminated. When the incident power becomes closer to the fiber fuse threshold value, the diameter $D_{melted}$ of the melted portion becomes smaller, so that the distance between the melted portion and the holes becomes large. For this reason, it is considered that, as the incident power approaches the fiber fuse threshold value, the effect of the holes on the fiber fuse is reduced, so that the phenomenon that the invasion distance is extended may occur.

As shown in the graph of FIG. 16, it was ascertained that the diameter $D_{melted}$ of the melted portion depends on the incident power, and therefore, to determine whether a HAF structure will reliably terminate a fiber fuse, it is desirable to carefully consider the diameter $D_{melted}$ of the melted portion, particularly when the incident power is near the fiber fuse threshold. In view of the phenomenon whereby the fiber fuse stops after slightly invading into the HAF, it is clear that the length of the HAF is important. In Experiment 3, the longest invasion distance was 640 μm at an incident power of 1.5 W. Accordingly, the length of a HAF used as a fiber fuse terminator is preferably at least 1 mm.

In addition, the fusion-splicing loss between the HAF and the SMF was a low value of 0.04 dB/point.

Example 3

Figure 10:
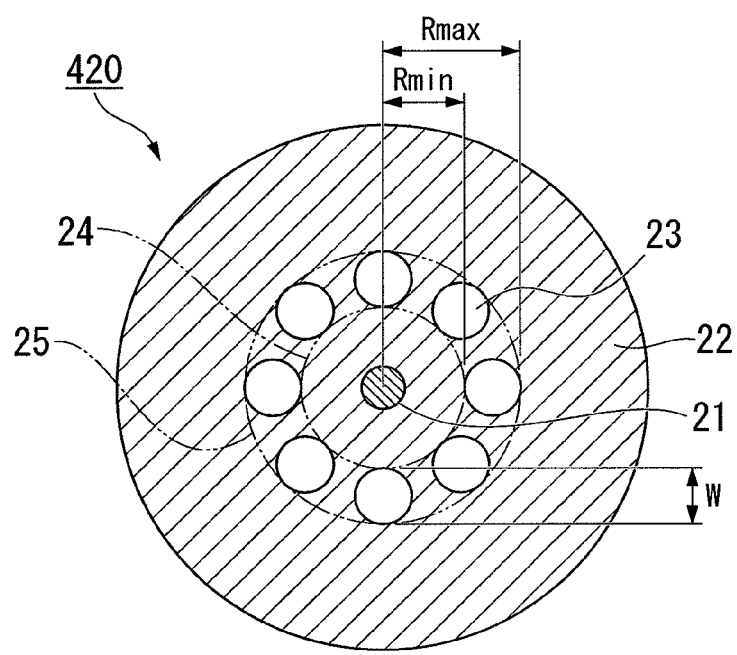
FIG. 10 is a cross-sectional view illustrating a hole-assisted optical fiber which has 8 holes according to a modified example of the first embodiment of the present invention.

The HAF (Fiber D) having the cross section shown in FIG. 10 is used as the optical fiber 55 to be measured, and Experiments 4-1 and 4-2 were performed by changing the incident power.

The experiment numbers 4-1 and 4-2 in Table 1 show the parameters of Fiber D and the experiment conditions. As for Fiber D, the cladding diameter $D_{fiber}$ is 125 μm, the number of the holes is 8, Rmin is 9.0 μm, W is 3.0 μm, Rmax is 12.0 μm, and the MFD at the wavelength of 1.55 μm is 10.0 μm. In addition, 2×Rmin/MFD is 1.80.

As for Fiber D, when the incident wavelength is 1.55 μm, and when the incident power is 1.7 W (experiment number 4-1) and when the incident power is 8.0 W (experiment number 4-2), the terminating performance of the fiber fuse was investigated.

In both Experiments 4-1 and 4-2, the value of 2×Rmin/MFD is 1.80, which is in a range no less than 1.2 and no more than 2.1. The value of W/MFD is 0.30, which is no less than 0.3. In addition, since the value of W is 3.0 μm and the value of $0.45 \times D_{fiber}$ is 56.25 μm, $W \leq 0.45 \times D_{fiber}$ is satisfied.

As a result of the experiments, the fiber fuse was able to be terminated in both the incident powers.

The fusion-splicing loss between the Fiber D and the SMF was a low value of no more than 0.03 dB/point.

Example 4

The HAF (Fiber E) having the cross section shown in FIG. 10 is used as the optical fiber 55 to be measured, and Experiments 4-3 and 4-4 were performed by changing the incident power.

The experiment numbers 4-3 and 4-4 in Table 1 show the parameters of Fiber E and the experiment conditions. As for Fiber E, the cladding diameter $D_{fiber}$ is 125 µm, the number of the holes is 8, Rmin is 10.2 µm, W is 3.2 µm, Rmax is 13.4 µm, and the MFD at the wavelength of 1.55 µm is 10.1 µm. In addition, 2×Rmin/MFD is 2.02.

As for Fiber E, when the incident wavelength is 1.55 µm, and when the incident power is 1.7 W (experiment number 4-3) and when the incident power is 8.0 W (experiment number 4-4), the terminating performance of the fiber fuse was investigated.

In both Experiments 4-3 and 4-4, the value of 2×Rmin/MFD is 2.02, which is in a range no less than 1.2 and no more than 2.1. The value of W/MFD is 0.32, which is no less than 0.3. In addition, since the value of W is 3.2 µm and the value of $0.45 \times D_{fiber}$ is 56.25 µm, $W \leq 0.45 \times D_{fiber}$ is satisfied.

As a result of the experiments, the fiber fuse was able to be terminated in both the incident powers.

The fusion-splicing loss between the Fiber E and the SMF was a low value of no more than 0.03 dB/point.

Example 5

Figure 7:
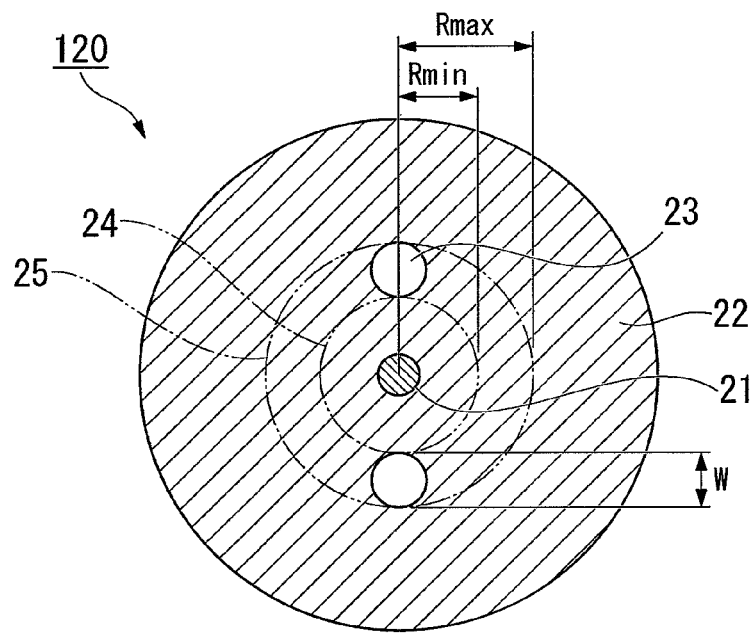
FIG. 7 is a cross-sectional view illustrating a hole-assisted optical fiber which has 2 holes according to a modified example of the first embodiment of the present invention.

The HAF (Fiber H) having the cross section shown in FIG. 7 is used as the optical fiber 55 to be measured, and Experiments 5-1 and 5-2 were performed by changing the incident power.

The experiment numbers 5-1 and 5-2 in Table 1 show the parameters of Fiber H and the experiment conditions. As for Fiber H, the cladding diameter $D_{fiber}$ is 125 µm, the number of the holes is 2, Rmin is 8.5 µm, W is 14.5 µm, Rmax is 23.0 µm, and the MFD at the wavelength of 1.55 µm is 10.0 µm. In addition, 2×Rmin/MFD is 1.70.

As for Fiber H, when the incident wavelength is 1.55 µm, and when the incident power is 3.0 W (experiment number 5-1) and when the incident power is 10.0 W (experiment number 5-2), the terminating performance of the fiber fuse was investigated.

In both Experiments 5-1 and 5-2, the value of 2×Rmin/MFD is 1.70, which is in a range no less than 1.2 and no more than 2.1. The value of W/MFD is 1.45, which is no less than 0.3. In addition, since the value of W is 14.5 µm and the value of $0.45 \times D_{fiber}$ is 56.25 µm, $W \leq 0.45 \times D_{fiber}$ is satisfied.

As a result of the experiments, the fiber fuse was able to be terminated in both the incident powers. From this result, it can be seen that the fiber fuse can be terminated even though the number of the holes is small.

The fusion-splicing loss between the Fiber H and the SMF was 0.50 dB/point. In Fiber H, of which the number of the holes is 2, since the number of the holes is small, the core is distorted when subjected to the fusion-splice, so that it is considered that the fusion-splicing loss becomes higher. On the other hand, in Fiber I in Example 6 (described later) of which the number of the holes is 3, the fusion-splicing loss for splicing with the SMF was a low value of 0.15 dB/point. It is clear from this that a large number of holes is desirable in the HAF, preferably three or more.

Example 6

Figure 8:
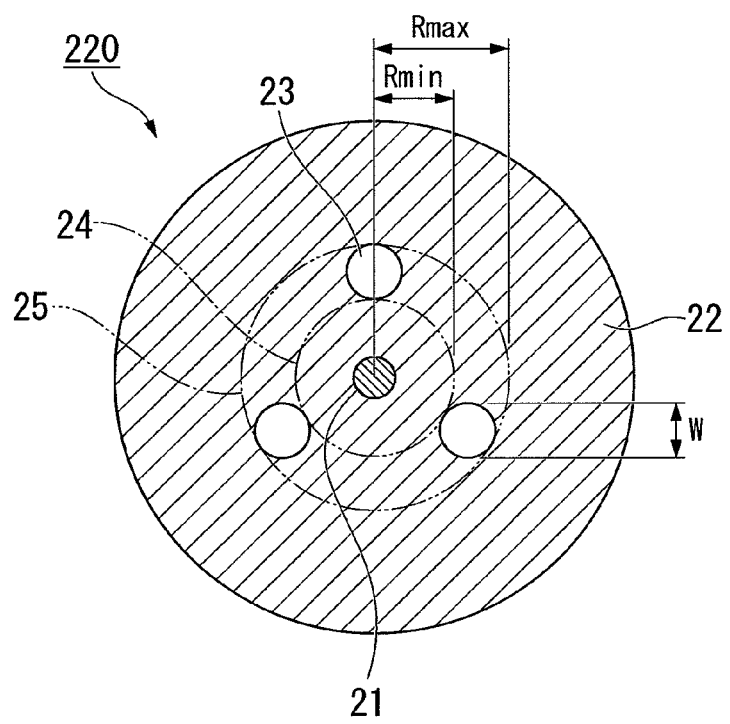
FIG. 8 is a cross-sectional view illustrating a hole-assisted optical fiber which has 3 holes according to a modified example of the first embodiment of the present invention.

The HAF (Fiber I) having the cross section shown in FIG. 8 is used as the optical fiber 55 to be measured, and Experiments 5-3 and 5-4 were performed by changing the incident power.

The experiment numbers 5-3 and 5-4 in Table 1 show the parameters of Fiber I and the experiment conditions. As for Fiber I, the cladding diameter $D_{fiber}$ is 125 µm, the number of the holes is 3, Rmin is 8.3 µm, W is 7.6 µm, Rmax is 15.9 µm, and the MFD at the wavelength of 1.55 µm is 9.8 µm. In addition, 2×Rmin/MFD is 1.69.

As for Fiber I, when the incident wavelength is 1.55 µm, and when the incident power is 3.0 W (experiment number 5-3) and when the incident power is 10.0 W (experiment number 5-4), the terminating performance of the fiber fuse was investigated.

In both Experiments 5-3 and 5-4, the value of 2×Rmin/MFD is 1.69, which is in a range no less than 1.2 and no more than 2.1. The value of W/MFD is 0.78, which is no less than 0.3. In addition, since the value of W is 7.6 µm and the value of $0.45 \times D_{fiber}$ is 56.25 µm, $W \leq 0.45 \times D_{fiber}$ is satisfied.

As a result of the experiments, the fiber fuse was able to be terminated in both the incident powers. From this result, it can be seen that the fiber fuse can be terminated even though the number of the holes is small.

The fusion-splicing loss between the Fiber I and the SMF was 0.15 dB/point. It is clear from this that a large number of holes is desirable in the HAF, preferably three or more.

Example 7

The HAF (Fiber J) having the cross section shown in FIG. 12 is used as the optical fiber 55 to be measured, and Experiment 6-1 was performed.

The experiment number 6-1 in Table 1 shows the parameters of Fiber J and the experiment conditions. Fiber J has a plurality of holes at different distances from the center of the core, and W is not equal to the hole diameter. As for Fiber J, the cladding diameter $D_{fiber}$ is 125 µm, the number of the holes is 12, the hole diameter is 4.0 µm, Rmin is 8.6 µm, W is 15.0 µm, Rmax is 23.6 µm, and the MFD at the wavelength of 1.55 µm is 8.2 µm. In addition, 2×Rmin/MFD is 2.10.

As for Fiber J, when the incident wavelength is 1.55 µm and the incident power is 10.0 W, the terminating performance of the fiber fuse was investigated.

In Experiment 6-1, the value of 2×Rmin/MFD is 2.10, which is in a range no less than 1.2 and no more than 2.1. The value of W/MFD is 1.83, which is no less than 0.3. In addition, since the value of W is 15.0 µm and the value of $0.45 \times D_{fiber}$ is 56.25 µm, $W \leq 0.45 \times D_{fiber}$ is satisfied.

As a result of the experiment, the fiber fuse was able to be terminated.

The fusion-splicing loss between the Fiber J and the SMF was a low value of 0.10 dB/point.

Example 8

The HAF (Fiber K) having the cross section shown in FIG. 11 is used as the optical fiber 55 to be measured, and Experiment 6-2 was performed.

The experiment number 6-2 in Table 1 shows the parameters of Fiber K and the experiment conditions. Fiber K has a plurality of holes at different distances from the center of the core, and W is not equal to the hole diameter. As for Fiber K, the cladding diameter $D_{fiber}$ is 125 µm, the number of the holes is 60, the hole diameter is 3.9 µm, Rmin is 8.5 µm, W is 30.0 μm, Rmax is 38.5 μm, and the MFD at the wavelength of 1.55 μm is 8.1 μm. In addition, 2×Rmin/MFD is 2.10.

As for Fiber K, when the incident power is 10.0 W, the terminating performance of the fiber fuse was investigated.

In Experiment 6-2, the value of 2×Rmin/MFD is 2.10, which is in a range no less than 1.2 and no more than 2.1. The value of W/MFD is 3.70, which is no less than 0.3. In addition, since the value of W is 30.0 μm and the value of 0.45×$D_{fiber}$ is 56.25 μm, W≦0.45×$D_{fiber}$ is satisfied.

As a result of the experiment, the fiber fuse was able to be terminated.

The fusion-splicing loss between the Fiber K and the SMF was a low value of 0.12 dB/point.

Example 9

The HAF (Fiber L) having the cross section shown in FIG. 9 is used as the optical fiber 55 to be measured, and Experiments 7-1 and 7-2 were performed by changing the incident power.

The experiment numbers 7-1 and 7-2 in Table 1 show the parameters of Fiber L and the experiment conditions. Fiber L has holes that are equidistant from the center of the core, and W is equal to the hole diameter.

As for Fiber L, the cladding diameter $D_{fiber}$ is 125 μm, the number of the holes is 6, Rmin is 5.5 μm, W is 6.2 μm, Rmax is 11.7 μm, and the MFD at the wavelength of 1.06 μm is 5.8 μm. In addition, 2×Rmin/MFD is 1.90.

As for Fiber L, when the incident wavelength is 1.06 μm, and when the incident power is 8.0 W (experiment number 7-1) and when the incident power is 20.0 W (experiment number 7-2), the terminating performance of the fiber fuse was investigated.

In both Experiments 7-1 and 7-2, the value of 2×Rmin/MFD is 1.90, which is in a range no less than 1.2 and no more than 2.1. The value of W/MFD is 1.07, which is no less than 0.3. In addition, since the value of W is 6.2 μm and the value of 0.45×$D_{fiber}$ is 56.25 μm, W≦0.45×$D_{fiber}$ is satisfied.

As a result of the experiments, the fiber fuse was able to be terminated in both the incident powers.

The fusion-splicing loss between the Fiber L and the SMF was a low value of 0.20 dB/point.

Also noted in the experiment number 7-2 (fiber L, incident power 20 W), there was a phenomenon in which a portion of UV-curable resin at the point where the fiber fuse was terminated was burned and carbonized. This UV-curable resin is a recoating over the fusion-splice portion between the HAF and the SMF. The reason is considered to be that, when the HAF terminated the fiber fuse occurring at high power of 20 W, high-power incident light leaked around the HAF, and this energy was absorbed into the UV-curable resin. Therefore, when using high-power incident light, the flameproof material as described above is preferably used as the HAF coating, or as the recoating for the fusion-splice portion between the HAF and the SMF.

Example 10

The HAF (Fiber N) having the cross section shown in FIG. 7 is used as the optical fiber 55 to be measured, and Experiment 7-5 was performed.

The experiment number 7-5 in Table 1 shows the parameters of Fiber N and the experiment conditions. As for Fiber N, the cladding diameter $D_{fiber}$ is 125 μm, the number of the holes is 2, Rmin is 5.5 μm, W is 4.5 μm, Rmax is 10.0 μm, and the MFD at the wavelength of 1.06 μm is 5.8 μm. In addition, 2×Rmin/MFD is 1.90.

As for Fiber N, when the incident wavelength is 1.06 μm and the incident power is 8.0 W, the terminating performance of the fiber fuse was investigated.

In Experiment 7-5, the value of 2×Rmin/MFD is 1.90, which is in a range no less than 1.2 and no more than 2.1. The value of W/MFD is 0.78, which is no less than 0.3. In addition, since the value of W is 4.5 μm and the value of 0.45×$D_{fiber}$ is 56.25 μm, W≦0.45×$D_{fiber}$ is satisfied.

As a result of the experiment, the fiber fuse was able to be terminated.

The fusion-splicing loss between the Fiber N and the SMF was a low value of 0.22 dB/point.

Example 11

Experiment 9-1 was performed using the same HAF (Fiber C) as that of Example 2.

The experiment number 9-1 in Table 1 shows the parameters of Fiber C and the experiment conditions. Similar to Example 2, as for Fiber C, the cladding diameter $D_{fiber}$ is 125 μm, the number of the holes is 4, Rmin is 10.6 μm, W is 16.3 μm, Rmax is 26.9 μm, and the MFD at the wavelength of 1.55 μm is 10.4 μm. In addition, 2×Rmin/MFD is 2.04.

As for Fiber C, when the incident wavelength is 1.55 μm and the incident power is 3.0 W, the terminating performance of the fiber fuse was investigated. In Experiment 9-1, the value of 2×Rmin/MFD is 2.04, which is in a range no less than 1.2 and no more than 2.1. The value of W/MFD is 1.57, which is no less than 0.3. In addition, since the value of W is 16.3 μm and the value of 0.45×$D_{fiber}$ is 56.25 μm, W≦0.45×$D_{fiber}$ is satisfied.

As a result of the experiment, the fiber fuse slightly invaded the HAF from the SMF as shown in FIG. 6, but stopped within 1 mm.

As described above, when the values of 2×Rmin/MFD, W/MFD, and 0.45×$D_{fiber}$ are in the above-mentioned ranges, the fiber fuse can be terminated using the hole-assisted optical fiber.

Example 12

The HAF (Fiber O) having the cross section shown in FIG. 3 is used as the optical fiber 55 to be measured, and Experiment 9-2 was performed.

The experiment number 9-2 in Table 1 shows the parameters of Fiber O and the experiment conditions.

As for Fiber O, the cladding diameter $D_{fiber}$ is 125 μm, the number of the holes is 4, Rmin is 7.5 μm, W is 14.3 μm, Rmax is 21.8 μm, and the MFD at the wavelength of 1.55 μm is 9.8 μm. In addition, the value of 2×Rmin/MFD is 1.53, which is in a range no less than 1.2 and no more than 2.1. The value of W/MFD is 1.46, which is no less than 0.3. In addition, since the value of W is 14.3 μm and the value of 0.45×$D_{fiber}$ is 56.25 μm, W≦0.45×$D_{fiber}$ is satisfied.

As for Fiber O, when the incident wavelength is 1.55 μm and the incident power is 3.0 W, the terminating performance of the fiber fuse was investigated. As a result, the fiber fuse did not invade Fiber O, and the fiber fuse was able to be terminated.

The fusion-splicing loss between Fiber O and the SMF was a low value of 0.15 dB/point.

Example 13

The HAF (Fiber P) having the cross section shown in FIG. 3 is used as the optical fiber 55 to be measured, and Experiment 9-3 was performed.

The experiment number 9-3 in Table 1 shows the parameters of Fiber P and the experiment conditions.

As for Fiber P, the cladding diameter $D_{fiber}$ is 125 μm, the number of the holes is 4, Rmin is 5.5 μm, W is 16.7 μm, Rmax is 22.2 μm, and the MFD at the wavelength of 1.55 μm is 9.2 μm. In addition, the value of 2×Rmin/MFD is 1.20, which is in a range no less than 1.2 and no more than 2.1. The value of W/MFD is 1.82, which is no less than 0.3. In addition, since the value of W is 16.7 μm and the value of 0.45×$D_{fiber}$ is 56.25 μm, W≦0.45×$D_{fiber}$ is satisfied.

As for Fiber P, when the incident wavelength is 1.55 μm and the incident power is 3.0 W, the terminating performance of the fiber fuse was investigated. As a result, the fiber fuse did not invade Fiber P, and the fiber fuse was able to be terminated.

The fusion-splicing loss between Fiber P and the SMF was 0.60 dB/point.

According to the result, it can be considered that, when Rmin is too close to MFD/2, the fiber fuse can be terminated, but the core is distorted when subjected to the fusion-splice so that the fusion-splicing loss becomes higher.

Comparative Example 1

The HAF (Fiber B) having the cross section in which 4 holes are provided in one layer is used as the optical fiber 55 to be measured, and Experiments 2-1 and 2-2 were performed by changing the incident power.

The experiment numbers 2-1 and 2-2 in Table 2 show the parameters of Fiber B used in this experiment and the experiment conditions. As for Fiber B, the cladding diameter $D_{fiber}$ is 125 μm, the number of the holes is 4, Rmin is 19.4 μm, W is 17.4 μm, Rmax is 36.8 μm, and the MFD at the wavelength of 1.55 μm is 10.8 μm. In addition, the value of 2×Rmin/MFD is 3.59, which is larger than 2.1.

As for Fiber B, when the incident wavelength is 1.55 μm, and when the incident power is 4.4 W (experiment number 2-1) and when the incident power is 2.0 W (experiment number 2-2), the terminating performance of the fiber fuse was investigated. As a result of the experiments, the fiber fuse passed through the HAF from the SMF, and the fiber fuse was not able to be terminated in either of the incident powers. The fusion-splicing loss between the HAF and the SMF was 0.03 dB/point.

Even when the HAF of this comparative example is used as the fiber fuse terminator in the middle of an optical transmission line or an optical fiber laser, the fiber fuse was not able to be terminated.

Comparative Example 2

The HAF (Fiber F) having the cross section in which 8 holes are provided in one layer is used as the optical fiber 55 to be measured, and Experiments 4-5 and 4-6 were performed by changing the incident power.

The experiment numbers 4-5 and 4-6 in Table 2 show the parameters of Fiber F and the experiment conditions. As for Fiber F, the cladding diameter $D_{fiber}$ is 125 μm, the number of the holes is 8, Rmin is 12.0 μm, W is 3.5 μm, Rmax is 15.5 μm, and the MFD at the wavelength of 1.55 μm is 10.3 μm. In addition, the value of 2×Rmin/MFD is 2.33, which is larger than 2.1.

As for Fiber F, when the incident wavelength is 1.55 μm, and when the incident power is 1.7 W (experiment number 4-5) and when the incident power is 8.0 W (experiment number 4-6), the terminating performance of the fiber fuse was investigated. As a result of the experiments, the fiber fuse was not able to be terminated in either of the incident powers.

The fusion-splicing loss between Fiber F and the SMF was a low value of no more than 0.03 dB/point.

Comparative Example 3

The HAF (Fiber G) having the cross section in which 8 holes are provided in one layer is used as the optical fiber 55 to be measured, and Experiments 4-7 and 4-8 were performed by changing the incident power.

The experiment numbers 4-7 and 4-8 in Table 2 show the parameters of Fiber G and the experiment conditions. As for Fiber G, the cladding diameter $D_{fiber}$ is 125 μm, the number of the holes is 8, Rmin is 14.8 μm, W is 4.2 μm, Rmax is 19.0 μm, and the MFD at the wavelength of 1.55 μm is 10.5 μm. In addition, the value of 2×Rmin/MFD is 2.82, which is larger than 2.1.

As for Fiber G, when the incident wavelength is 1.55 μm, and when the incident power is 1.7 W (experiment number 4-7) and when the incident power is 8.0 W (experiment number 4-8), the terminating performance of the fiber fuse was investigated. As a result of the experiments, the fiber fuse was not able to be terminated in either of the incident powers.

The fusion-splicing loss between Fiber G and the SMF was a low value of no more than 0.03 dB/point.

Comparative Example 4

The HAF (Fiber M) having substantially the cross section shown in FIG. 9 is used as the optical fiber 55 to be measured, and Experiments 7-3 and 7-4 were performed by changing the incident power.

The experiment numbers 7-3 and 7-4 in Table 2 show the parameters of Fiber M used in this experiment and the experiment conditions.

As for Fiber M, the cladding diameter $D_{fiber}$ is 125 μm, the number of the holes is 6, Rmin is 5.6 μm, W is 1.4 μm, Rmax is 7.0 μm, and the MFD at the wavelength of 1.06 μm is 5.9 μm. In addition, the value of 2×Rmin/MFD is 1.9, which is in a range no less than 1.2 and no more than 2.1. In addition, since the value of W is 1.4 μm and the value of 0.45×$D_{fiber}$ is 56.25 μm, W≦0.45×$D_{fiber}$ is satisfied. However, since the value of W is small at 1.4 μm, the value of W/MFD becomes 0.24, which is smaller than 0.3.

As for the HAF, when the incident power is 8.0 W (experiment number 7-3), and when the incident power is 20.0 W (experiment number 7-4), the terminating performance of the fiber fuse was investigated. As a result of the experiments, the fiber fuse was not able to be terminated in either of the incident powers.

The fusion-splicing loss between the Fiber M and the SMF was a low value of 0.18 dB/point.

Comparative Example 5

Experiments 8-2 and 8-3 were performed using the same HAF (Fiber C) as that of Example 2. The experiment numbers 8-2 and 8-3 in Table 2 show the parameters of Fiber C and the experiment conditions.

When the incident wavelength is 1.31 μm (experiment number 8-2) and when the incident wavelength is 1.06 μm (experiment number 8-3), the terminating performance of the fiber fuse was investigated.

Similar to Example 2, as for Fiber C, the cladding diameter $D_{fiber}$ is 125 μm, the number of the holes is 4, Rmin is 10.6 μm, and W is 16.3 μm, and Rmax is 26.9 μm. However, since the incident wavelength is different from that of Example 2, the MFD is also different. The MFD at the wavelength of 1.31 μm is 9.3 μm, and the MFD at the wavelength of 1.06 μm is 8.3 μm. Therefore, the value of 2×Rmin/MFD is 2.3 at the wavelength of 1.31 μm, and 2.6 at the wavelength of 1.06 μm, so that it is larger than 2.1 in both cases.

As a result of experiments, in both the cases of Experiments 8-2 and 8-3, the fiber fuse was not able to be terminated.

Comparative Examples 6 and 7

Figure 17:
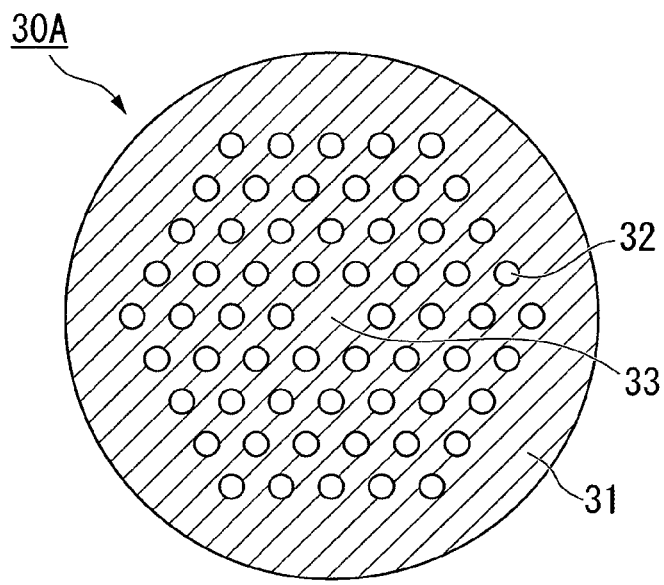
FIG. 17 is a cross-sectional view schematically illustrating a structure of a fiber Q which is used in Experiment 10-1.
Figure 18:
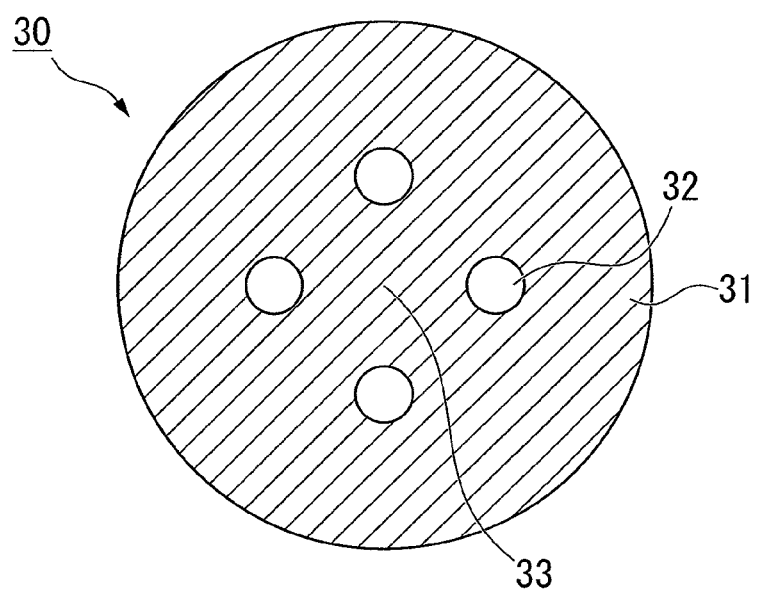
FIG. 18 is a cross-sectional view schematically illustrating a structure of a fiber R which is used in Experiment 10-2.

The HAF (Fibers Q and R) having the cross section shown in FIGS. 17 and 18 is used as the optical fiber 55 to be measured, and Experiments 10-1 and 10-2 were performed.

The experiment numbers 10-1 and 10-2 in Table 2 show the parameters of Fibers Q and R and the experiment conditions.

In Fiber K (the number of the holes is 60) used in Example 8 and Fiber O (the number of the holes is 4) used in Example 12, the refractive index of the core is higher than the refractive index of the material of the cladding excepting the portions of the holes. In this regard, as shown in FIGS. 17 and 18, fiber Q (the number of holes is 60, FIG. 17) and fiber R (the number of holes is 4, FIG. 18), which have a plurality of holes 32 in a medium 31 but do not have a high-refractive-index core at a center portion 33 of optical fibers 30 and 30A, were manufactured.

As for the optical fibers, when the incident wavelength is 1.55 μm and the incident power is 10.0 W, the terminating performance of the fiber fuse was investigated. As a result, both of the optical fibers were able to terminate the fiber fuse.

The splicing loss of Fiber Q was 0.80 dB/point, which is larger than the splicing loss of 0.12 dB/point of Fiber K which has the same number of holes as Fiber Q. In addition, the splicing loss of Fiber R was 0.75 dB/point, which is larger than the splicing loss of 0.15 dB/point of Fiber O which has the same number of holes as Fiber R. As clearly shown by this result, although a fiber with a structure without a core having a high refractive index with respect to a medium without holes can terminate a fiber fuse, it has a problem of considerable splicing loss.

Since the splicing loss is significant, Fiber Q and Fiber R are not suitable for the fiber fuse terminator.

The investigation on the examples and the comparative examples is described in the following.
(1: Regarding "2×Rmin/MFD")

As shown in Tables 1 and 2, the above experiments revealed that various features of the configuration, such as the number of holes, the structure of holes, incident power (also termed "optical intensity"), and incident wavelength are related to fiber fuse terminating performance. One parameter used was "2×Rmin/MFD". Using this parameter as an indicator, it is possible to unambiguously determine the terminating performance of the fiber fuse.

The lowest value of 2×Rmin/MFD was proved to be 1.2 by Experiment 9-3 (Example 13). Therefore, when 2×Rmin/MFD is no less than 1.2, the fiber fuse can be terminated. While fibers with 2×Rmin/MFD of less than 1.2 can be manufactured generally, they have a problem of relatively high splicing loss.

The highest value of 2×Rmin/MFD was proved to be 2.1 by the results of Experiments 6-1 and 6-2 (Examples 7 and 8). In addition, from the results of Experiments 3-1 to 3-5 (Example 2), when 2×Rmin/MFD is 2.0, although there is slightly invasion of the fiber fuse into the HAF, since the invasion distance is small within 1 mm, there is no damage to the light source or the transmission equipment. Furthermore, in Experiments 6-1 and 6-2, the splicing loss is suppressed to low values of 0.10 dB/point and 0.12 dB/point. Disposing the holes near the core is thought to be effective in infallibly terminating fiber fuses. In this regard, as shown in Experiments 1-1 and 1-2 (Example 1), 2×Rmin/MFD is preferably no more than 1.7.
(2: Regarding "W/MFD" and "W/$D_{fiber}$.")

According to the results of Fiber M of Experiments 7-3 and 7-4 (Comparative Example 4), it was proved that, when the ratio between the MFD at the used wavelength and the width W of the hole region is small (W/MFD=0.22), even though 2×Rmin/MFD is 1.9, in some cases the fiber fuse cannot be terminated. In addition, according to the results of Fiber D of Experiments 4-1 and 4-2 (Example 3), it was proved that, when 2×Rmin/MFD is 1.8 and W/MFD is 0.3, the fiber fuse can be terminated. It follows that, by ensuring that W/MFD is no less than 0.3, the fiber fuse can be terminated more reliably.

Moreover, when the cladding diameter of an optical fiber including the core and holes described above is assumed to be $D_{fiber}$, it is preferable that W≦0.45×$D_{fiber}$ be satisfied. If this is not satisfied, the ratio of the sectional area of the fiber occupied by the sectional area of the holes increases, and the fiber cannot maintain its strength.
(3: Regarding Sectional Area of Holes)

When the incident light has high power, not only the value of W/MFD but also the ratio of the area S defined by a region between a circle having radius Rmax around the core center and a circle having radius Rmin around the core center (hereinafter "hole region") to the area of a region occupied by the holes is important. Fibers H and I used in Experiments 5-1 to 5-4 (Examples 5 and 6) have area ratios occupied by the holes of 23.0% and 23.6%, respectively, and each was able to terminate the fiber fuse when the incident power was 10 W. Thus, when the holes occupy no less than 20% of the hole region, fiber fuses can be more reliably terminated, even at high power.

Since there were cases such as fiber J of Example 7 where, even though the area ratio occupied by the holes is less than 10%, the fiber fuse was successfully terminated at incident power of 10 W, this area ratio is not a necessary requirement of the present invention.
(4: Regarding Splicing Loss)

Generally, when splicing different types of optical fibers, acceptable splicing loss may be about 1 dB in consideration of a design margin for the transmission system. Thus, when splicing the both ends of a fiber fuse terminator, acceptable splicing loss for a single splice place is assumed to be approximately 0.5 dB.
(5: Regarding Number of Holes)

As is clear from the results of Examples 2, 5, and 6, splicing loss sharply decreases as the number of holes increases to 2, 3, and 4. As described above, to keep splicing loss per splice place below 0.5 dB, at least three or more holes are preferable.
(6: Regarding Length of HAF)

The phenomenon seen in Experiments 3-1 to 3-5 (Example 2), in which the fiber fuse stops after a slight invasion, confirms that the length of the HAF (length of hole portion) is important when using it as a fiber fuse terminator. The longest invasion distance in Example 2 was 630 μm at incident power of 1.5 W. Therefore, the length of a HAF used as a fiber fuse terminator is preferably no less than 1 mm. More preferably, to cope with sharp elongations of the invasion distance such as the one shown in the graph of FIG. 14, it is preferable that the HAF length be approximately 10 mm.
<Example Applied to Yb Fiber Laser>

Figure 19:
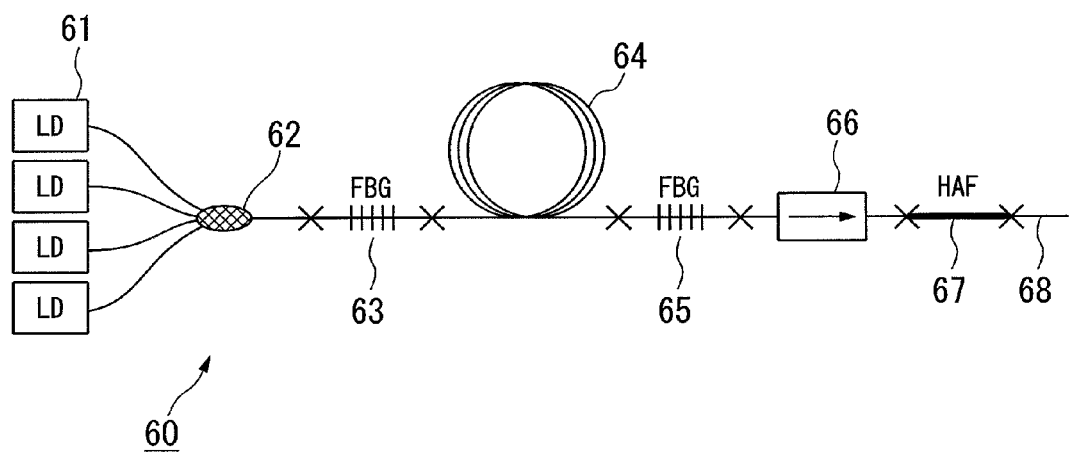
FIG. 19 is a view illustrating an exemplary configuration of a Yb-doped optical fiber laser using a fiber fuse terminator of the present invention.

As shown in FIG. 19, a fiber fuse terminator 67 configured from an HAF having a length of 50 mm was incorporated in a part of an output part of an optical fiber laser apparatus 60 using a ytterbium (Yb)-doped double-cladding optical fiber (rare-earth doped optical fiber) 64. The fibers were fusion-spliced together. In FIG. 19, symbol x represents fusion-splice point.

This Yb fiber laser has an oscillating wavelength of 1,060 nm, and an output power of 3 W. The optical fiber laser apparatus 60 also includes a multi-port coupler 62 with which a plurality of laser diodes (LD) 61 for excitation, which serve as excitation sources, are connected, fiber Bragg gratings (FBG) 63 and 65 inserted before and after the Yb-doped double-cladding optical fiber 64, and an isolator 66 for stopping a fiber fuse from proceeding any further when the fiber fuse terminator 67 has allowed the fiber fuse to pass.

The optical fiber 68 at the output terminal is a single mode optical fiber in which the outer diameter is 125 μm, and the MFD at the wavelength of 1,060 nm is 7.1 μm.

As for the HAF which is used as the fiber fuse terminator 67, the outer diameter is 125 μm, the MFD at the wavelength of 1,060 nm is 7.4 μm, the number of the holes is 6, Rmin is 6.3 μm, 2×Rmin/MFD is 1.7, and W is 5.2 μm.

In the optical fiber laser apparatus 60, when a fiber fuse was deliberately generated by increasing the temperature of the optical fiber 68 at the output terminal, it was possible to terminate the fiber fuse in the HAF 67. Also, since polyimide was used as the coating of the HAF 67 and as the recoating over the fusion-splice portions at both ends, the coating did not burn. The optical fiber was thus protected from the fiber fuse, enabling the apparatus to be repaired simply by replacing and reconnecting the output fibers (the HAF 67 and the SMF 68).

As a comparative example, when the same test was performed without inserting the HAF 67, the fiber fuse that was deliberately generated in the optical fiber 68 at the output terminal stopped after damaging part of the isolator 66. To repair the apparatus, this expensive isolator had to be replaced.

<Example Applied to Er Fiber Laser>

Figure 20:
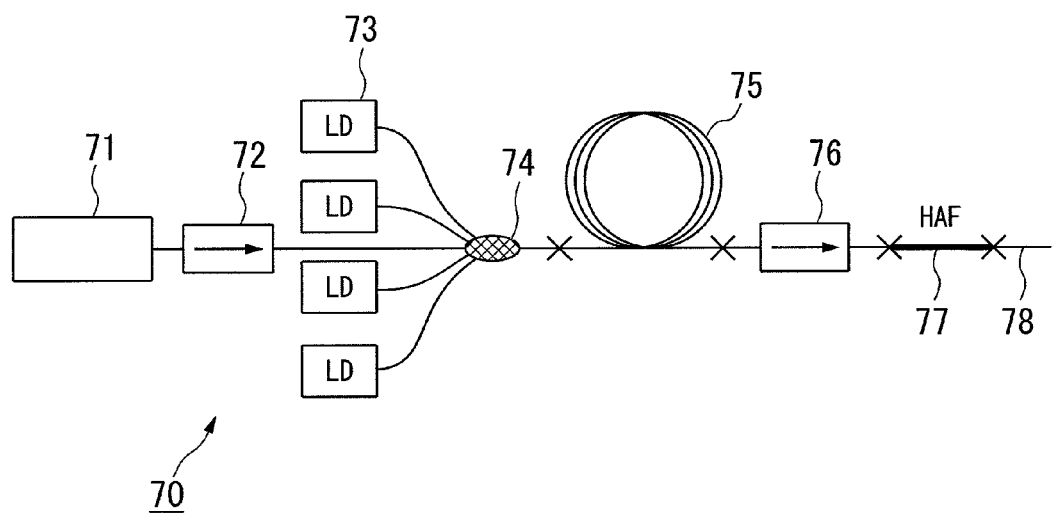
FIG. 20 is a view illustrating an exemplary configuration of an Er-doped optical fiber laser using a fiber fuse terminator of the present invention.

As shown in FIG. 20, a fiber fuse terminator 77 configured from an HAF having a length of 60 mm was incorporated in a part of an output part of an optical fiber laser apparatus 70 using an erbium (Er)-doped double-cladding optical fiber (rare-earth doped optical fiber) 75. The fibers were fusion-spliced together. In FIG. 20, symbol x represents fusion-splice point.

This Er fiber laser has an oscillating wavelength of 1,550 nm, and an output power of 4 W. The optical fiber laser apparatus 70 also includes a DFB laser 71 with a wavelength of 1,550 nm, an isolator 72 for preventing light from returning to the DFB laser 71, a multi-port coupler 74 with which a plurality of laser diodes (LD) 73 for excitation, which serve as excitation sources, are connected, and an isolator 76 for stopping a fiber fuse from proceeding any further when the fiber fuse terminator 77 has allowed the fiber fuse to pass.

The optical fiber 78 at the output terminal is a single mode optical fiber in which the outer diameter is 125 μm, and the MFD at the wavelength of 1,550 nm is 9.8 μM.

As for the HAF which is used as the fiber fuse terminator 77, the outer diameter is 125 μm, the MFD at the wavelength of 1,550 nm is 10.0 μm, the number of the holes is 4, Rmin is 8.1 μm, 2×Rmin/MFD is 1.6, and W is 7.0 μm.

In the optical fiber laser apparatus 70, when a fiber fuse was deliberately generated by increasing the temperature of the optical fiber 78 at the output terminal, it was possible to terminate the fiber fuse in the HAF 77. Also, since polyimide was used as the coating of the HAF 77 and as the recoating over the fusion-splice portions at both ends, the coating did not burn. The optical fiber was thus protected from the fiber fuse, enabling the apparatus to be repaired simply by replacing and reconnecting the output fibers (the HAF 77 and the SMF 78).

In addition, when a fiber fuse occurs in the Er-doped double-clad optical fiber 75, it propagates towards the LD 73 and the DFB 71. However, since a multi-mode optical fiber is used for the output of the LD, the fiber fuse does not propagate any further in the direction of the LD 73. Furthermore, since the DFB laser 71 has an output of approximately several mW, the fiber fuse does not propagate in the direction of the DFB laser 71.

INDUSTRIAL APPLICABILITY

The fiber fuse terminator of the present invention terminates the fiber fuse in an optical transmission line or an optical fiber laser through which high-power light is propagated and prevents damage to the transmission equipment or the light source, so that it can be appropriately used.

DESCRIPTION OF THE REFERENCE SYMBOLS 20, 120, 220, 320, 420, 20A, 120A: HOLE-ASSISTED OPTICAL FIBER (OPTICAL FIBER)
21: CORE
22: CLADDING
23: HOLE
67, 77: FIBER FUSE TERMINATOR

The invention claimed is:

1. A fiber fuse terminator which is used to terminate a fiber fuse, comprising:
an optical fiber which includes a core and a cladding having holes extending in a longitudinal direction thereof,
wherein:
a refractive index of the core of the optical fiber is higher than a refractive index of a portion of the cladding excepting portions of the holes;
when it is assumed that a mode field diameter at a used wavelength of the optical fiber is MFD, and a distance, in a cross section perpendicular to the longitudinal direction of the optical fiber, between a center of the core and a position, closest to the center of the core, of the hole that is closest to the core is Rmin, a value expressed by 2×Rmin/MFD is no less than 1.2 and no more than 2.1;
when it is assumed that a width in a diameter direction of a region where the holes present in the cladding is W, a value expressed by W/MFD is no less than 0.3; and
when it is assumed that a diameter of the cladding of the optical fiber is $D_{fiber}$, $W \leq 0.45 \times D_{fiber}$ is satisfied;
each end of the optical fiber is fusion-spliced to an optical fiber having no holes, and the fusion-splicing loss per one point thereon is no greater than 0.50 dB;
a portion of a surface of the optical fiber, excepting a fusion-splice portion between the optical fiber and the optical fiber having no holes and a periphery thereof, is covered with a resin coating; and
the fusion-splice portion and the periphery thereof of the surface of the optical fiber are covered with a flameproof protective layer.

2. The fiber fuse terminator according to claim 1,
wherein when it is assumed that a distance, in the cross section perpendicular to the longitudinal direction of the optical fiber, between the center of the core and a position, closest to the center of the core, of the hole that is closest to the core is Rmin, a distance, in the cross section perpendicular to the longitudinal direction of the optical fiber, between the center of the core and a position, furthest from the center of the core, of the hole that is furthest from the core is Rmax, and a sectional area of a region between a circle having a radius of Rmax around the center of the core and a circle having a radius of Rmin around the center of the core is S, a sectional area of a portion where the holes are provided in the region between the circle having the radius of Rmax and the circle having the radius of Rmin is no less than 20% of the sectional area S.

3. The fiber fuse terminator according to claim 1, wherein the optical fiber having no holes is a single-mode optical fiber.

4. The fiber fuse terminator according to claim 1, wherein the number of the holes of the optical fiber is no less than 3.

5. The fiber fuse terminator according to claim 1, wherein each end of the optical fiber is fusion-spliced to the optical fiber having no holes by intermittent discharging or sweep discharging.

6. The fiber fuse terminator according to claim 1, wherein a length of the optical fiber is no less than 1 mm.

7. A fiber fuse terminator which is used to terminate a fiber fuse, comprising:
an optical fiber which includes a core without holes and a cladding having one layer of holes extending in a longitudinal direction thereof,
wherein:
a refractive index of the core of the optical fiber is higher than a refractive index of a portion of the cladding excepting portions of the holes;
when it is assumed that a mode field diameter at a used wavelength of the optical fiber is MFD, and a distance, in a cross section perpendicular to the longitudinal direction of the optical fiber, between a center of the core and a position, closest to the center of the core, of the hole that is closest to the core is Rmin, a value expressed by 2×Rmin/MFD is no less than 1.2 and no more than 2.1;
when it is assumed that a width, in a diameter direction, of a region where the holes present in the cladding is W, a value expressed by W/MFD is no less than 0.3;
when it is assumed that a diameter of the cladding of the optical fiber is $D_{fiber}$, $W \leq 0.45 \times D_{fiber}$ is satisfied;
each end of the optical fiber is fusion-spliced to an optical fiber having no holes, and the fusion-splicing loss per one point thereon is no greater than 0.50 dB;
a portion of a surface of the optical fiber, excepting a fusion-splice portion between the optical fiber and the optical fiber having no holes and a periphery thereof, is covered with a resin coating;
the fusion-splice portion and the periphery thereof of the surface of the optical fiber are covered with a flameproof protective layer; and
when it is assumed that a distance, in the cross section perpendicular to the longitudinal direction of the optical fiber, between the center of the core and a position, closest to the center of the core, of the hole that is closest to the core is Rmin, a distance, in the cross section perpendicular to the longitudinal direction of the optical fiber, between the center of the core and a position, furthest from the center of the core, of the hole that is furthest from the core is Rmax, and a sectional area of a region between a circle having a radius of Rmax around the center of the core and a circle having a radius of Rmin around the center of the core is S, a sectional area of a portion where the holes are provided in the region between the circle having the radius of Rmax and the circle having the radius of Rmin is no less than 20% of the sectional area S.

8. The fiber fuse terminator according to claim 7, wherein a length of the optical fiber is no less 1 mm.

9. An optical transmission line using an optical fiber, wherein the fiber fuse terminator according to claim 1 is inserted into the optical transmission line.

10. An optical transmission line using an optical fiber, wherein the fiber fuse terminator according to claim 7 is inserted into the optical transmission line.

\* \* \* \* \*